US012652187B2

(12) United States Patent
Ihara

(10) Patent No.: US 12,652,187 B2
(45) Date of Patent: *Jun. 9, 2026

(54) INFORMATION PROCESSING SYSTEM, INFORMATION PROCESSING DEVICE, INFORMATION PROCESSING METHOD, AND RECORDING MEDIUM

(71) Applicant: SONY GROUP CORPORATION, Tokyo (JP)

(72) Inventor: Keigo Ihara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/758,936

(22) Filed: Jun. 28, 2024

(65) Prior Publication Data

US 2024/0356772 A1 Oct. 24, 2024

Related U.S. Application Data

(63) Continuation of application No. 17/746,612, filed on May 17, 2022, now Pat. No. 12,074,723, which is a
(Continued)

(30) Foreign Application Priority Data

Jul. 27, 2017 (JP) ................................. 2017-145236

(51) Int. Cl.
*G06F 15/16* (2006.01)
*G06V 20/10* (2022.01)
(Continued)

(52) U.S. Cl.
CPC .......... *H04L 12/1845* (2013.01); *G06V 20/10* (2022.01); *G06V 20/53* (2022.01); *H04L 12/1859* (2013.01)

(58) Field of Classification Search
CPC ........................ H04L 12/1845; H04L 12/1859
See application file for complete search history.

(56) References Cited

U.S. PATENT DOCUMENTS

| | | | | |
|---|---|---|---|---|
| 11,388,016 | B2 * | 7/2022 | Ihara | H04N 21/25841 |
| 12,074,723 | B2 * | 8/2024 | Ihara | G06Q 30/0281 |
| 2013/0291025 | A1 | 10/2013 | Ozawa et al. | |
| 2014/0012539 | A1 | 1/2014 | Takaoka | |

(Continued)

FOREIGN PATENT DOCUMENTS

| | | |
|---|---|---|
| JP | 2003-219287 A | 7/2003 |
| JP | 2006-155085 A | 6/2006 |

(Continued)

OTHER PUBLICATIONS

International Search Report issued Jul. 31, 2018, in PCT/JP2018/018318 filed May 11, 2018, citing documents AQ-AW therein, 2 pages.

(Continued)

*Primary Examiner* — Yves Dalencourt
(74) *Attorney, Agent, or Firm* — Oblon, McClelland, Maier & Neustadt, L.L.P.

(57) ABSTRACT

To provide an information processing system, an information processing device, an information processing method, and a recording medium capable of distributing special content for relieving a user's negative circumstances.
According to the present disclosure, there is provided an information processing system including: a communication unit configured to receive at least current position information regarding a user; and a control unit configured to cause the communication unit, if the control unit determines that a predetermined area containing a position indicated by the current position information is an area that makes people staying in the predetermined area feel unpleasant, to distribute specific content to the user.

12 Claims, 24 Drawing Sheets

Related U.S. Application Data continuation of application No. 16/631,864, filed as application No. PCT/JP2018/018318 on May 11, 2018, now Pat. No. 11,388,016.

(51) Int. Cl.
*G06V 20/52* (2022.01)
*H04L 12/18* (2006.01)

(56) References Cited

U.S. PATENT DOCUMENTS

| | | | |
|---|---|---|---|
| 2014/0201632 A1 | 7/2014 | Kunigita et al. | |
| 2014/0266782 A1 | 9/2014 | You et al. | |
| 2014/0295886 A1 | 10/2014 | Tickoo et al. | |
| 2015/0088671 A1 | 3/2015 | Xiong et al. | |
| 2015/0142481 A1 | 5/2015 | Mcmanus | |
| 2016/0140095 A1 | 5/2016 | Park | |
| 2016/0148238 A1* | 5/2016 | He | G06Q 30/0207 705/14.1 |
| 2016/0179455 A1 | 6/2016 | Liu et al. | |
| 2016/0366715 A1 | 12/2016 | Murayama et al. | |
| 2017/0150321 A1 | 5/2017 | Ciecko | |
| 2019/0371028 A1 | 12/2019 | Harrises et al. | |

FOREIGN PATENT DOCUMENTS

| | | | |
|---|---|---|---|
| JP | 2008102822 A | 5/2008 | |
| JP | 2010-220151 A | 9/2010 | |
| JP | 2012039244 A | 2/2012 | |
| JP | 2012-212365 A | 11/2012 | |
| JP | 2014-134922 A | 7/2014 | |
| JP | 2014-191394 A | 10/2014 | |
| JP | 2016-505190 A | 2/2016 | |
| JP | 2016-66173 A | 4/2016 | |
| JP | 2017-5705 A | 1/2017 | |
| JP | 2017-22505 A | 1/2017 | |
| JP | 2017-502437 A | 1/2017 | |

OTHER PUBLICATIONS

Partial Supplementary European Search Report issued Jun. 9, 2020 in European Patent Application No. 18838949.8, citing documents AD and AM therein, 23 pages.
Takeshi Otake and Hiroshi Doi, "Attribute-based encryption with arbitrary No. of authorities", The Institute of Electronics, Information and Communication Engineers, Aug. 15, 2010.

* cited by examiner

*FIG. 4*

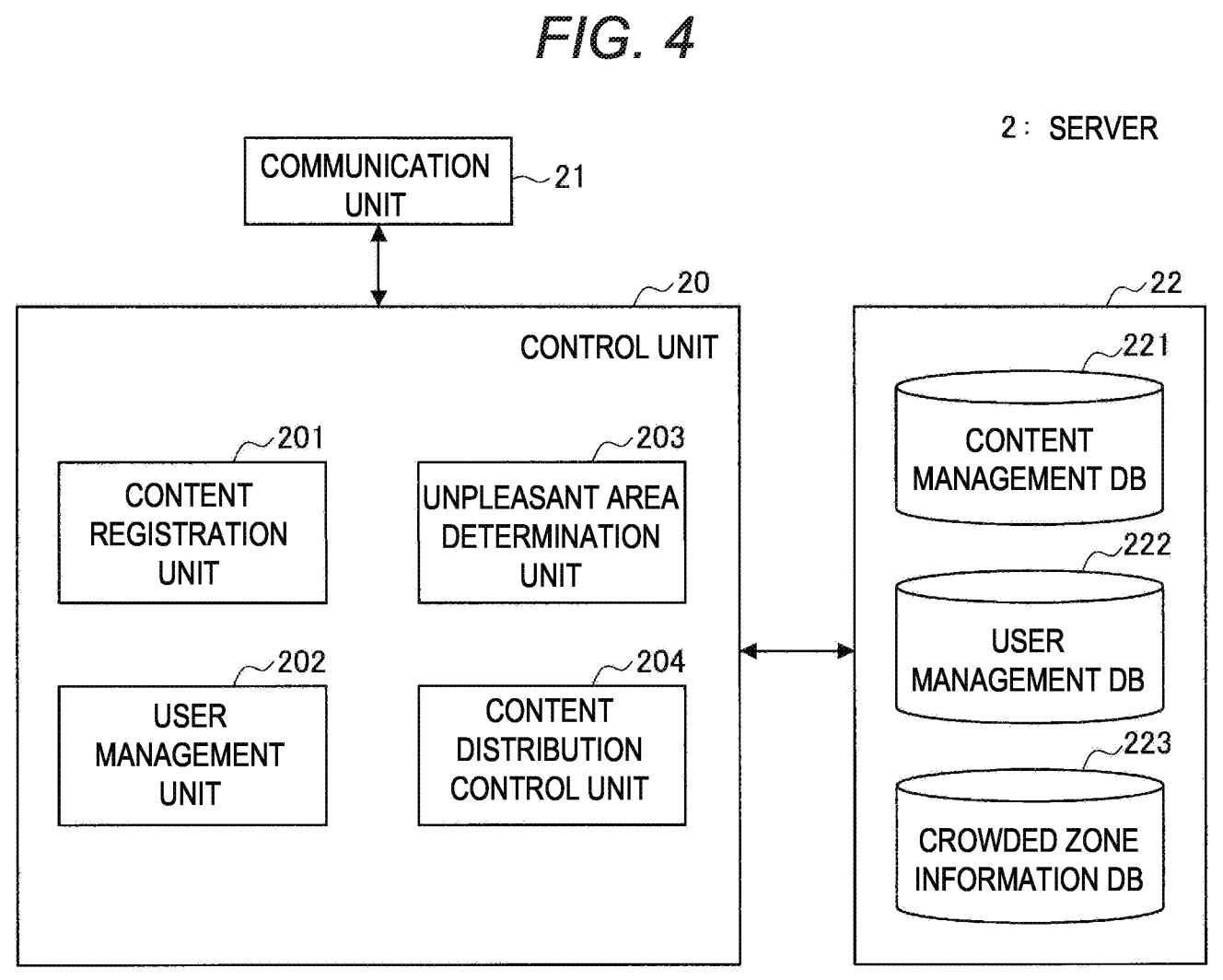

2 : SERVER

22

221 — CONTENT MANAGEMENT DB

222 — USER MANAGEMENT DB

223 — CROWDED ZONE INFORMATION DB

21 — COMMUNICATION UNIT

20 — CONTROL UNIT

201 — CONTENT REGISTRATION UNIT

202 — USER MANAGEMENT UNIT

203 — UNPLEASANT AREA DETERMINATION UNIT

204 — CONTENT DISTRIBUTION CONTROL UNIT

FIG. 5

| AREA | AREA TYPE | TIME PERIOD | CONGESTION |
|---|---|---|---|
| (x1-0,y1-0), (x1-1,y1-1), (x1-2,y1-2).... (x1-n,y1-n) | RAMEN SHOP | 08:25~09:35 | AVERAGE OF 20 PERSONS WAITING IN LINE |
| (x2-0,y2-0), (x2-1,y2-1), (x2-2,y2-2).... (x2-n,y2-n) | **RESTAURANT | 11:40~43:50 | AVERAGE OF 12 PERSONS WAITING IN LINE |
| (x3-0,y3-0), (x3-1,y3-1), (x3-2,y3-2).... (x3-n,y3-n) | XX EXPO | 13:00~16:30 | AVERAGE OF 85 PERSONS PER 10 METERS SQUARE |
| (x4-0,y4-0), (x4-1,y4-1), (x4-2,y4-2).... (x4-n,y4-n) | LAN-LAN LAND (AMUSEMENT PARK) | 10:30~12:00 | AVERAGE OF 60 PERSONS PER 10 METERS SQUARE |
| ⋮ | ⋮ | ⋮ | ⋮ |

MOTION CAPTURE OF HUMAN BODY

DETERMINATION OF LINE

USER TERMINAL

SERVER

DISPLAY USER REGISTRATION SCREEN, RECEIVE INPUT OF NAME AND VARIOUS PROFILES — S103

ACQUIRE FACE IMAGE OF USER — S106

ACQUIRE BEACON ID OF INFRARED BEACON — S109

S112

TRANSMIT ACQUIRED USER INFORMATION

S115

REGISTER USER INFORMATION IN USER MANAGEMENT DB

ANY OF THE FOLLOWING CAN BE SPECIFIED (YOU CAN
SPECIFY MULTIPLE ITEMS)

◉ SPECIFY BY ZONE SECTION INFORMATION $(x0,y0), (x1,y1), (x2,y2), (x3,y3)$

◯ SPECIFY BY ZONE TYPE

| RAMEN SHOP | ▽ |

◯ SPECIFY BY TIME PERIOD

| ONLY ON SUNDAYS FROM 11:00 TO 19:00 | ▽ |

◉ SPECIFY BY CONGESTION

| 5 OR MORE PEOPLE WAITING IN LINE | ▽ |

☑ DISTRIBUTE ONLY TO REGISTERED USERS

CONTENT TO DISTRIBUTE

| ANIME AAA STORY EP. 12 | BROWSE |

REGISTER

Figure 11:
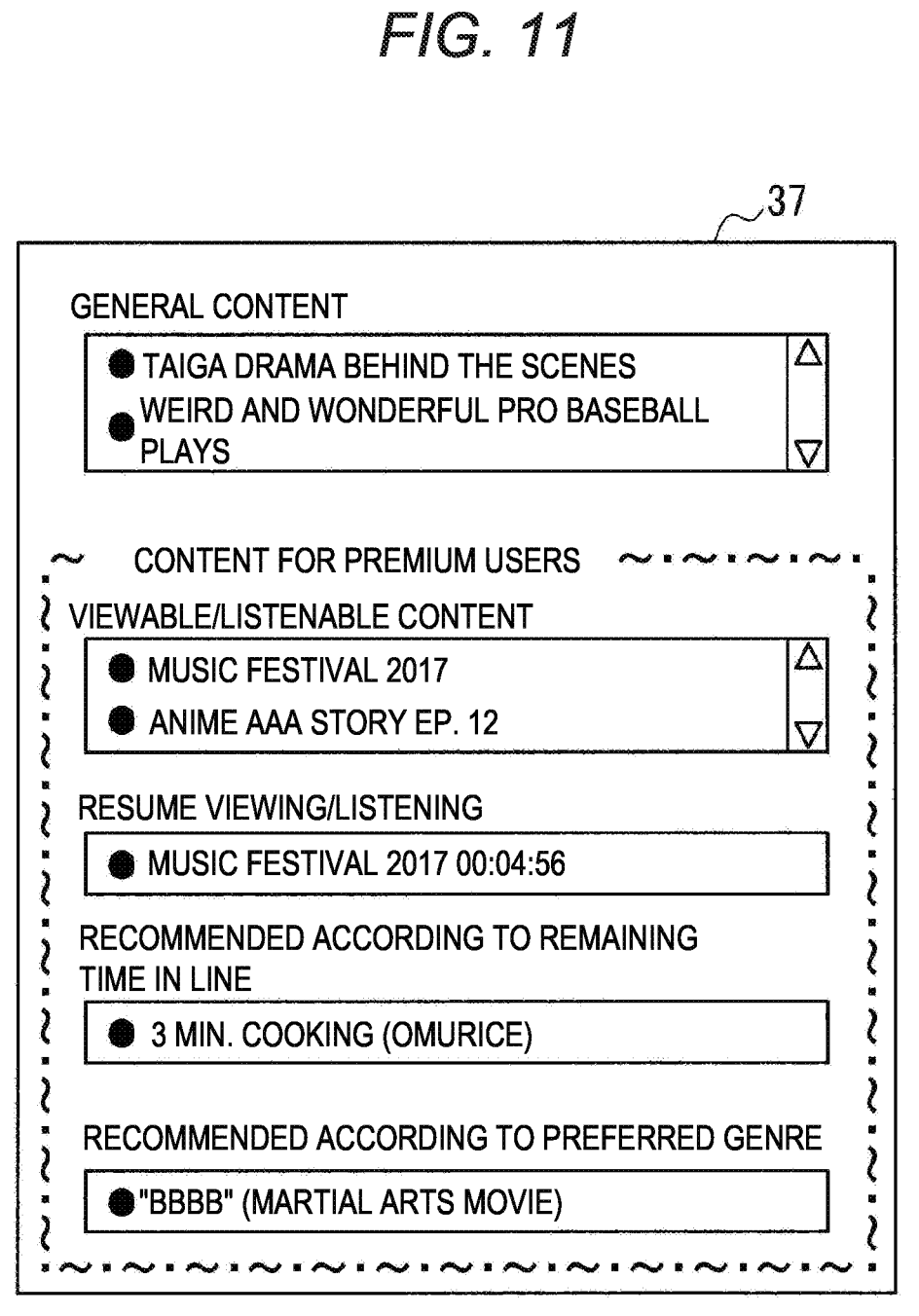

GENERAL CONTENT

● TAIGA DRAMA BEHIND THE SCENES
● WEIRD AND WONDERFUL PRO BASEBALL
PLAYS

CONTENT FOR PREMIUM USERS

VIEWABLE/LISTENABLE CONTENT

● MUSIC FESTIVAL 2017
● ANIME AAA STORY EP. 12

RESUME VIEWING/LISTENING

● MUSIC FESTIVAL 2017 00:04:56

RECOMMENDED ACCORDING TO REMAINING
TIME IN LINE

● 3 MIN. COOKING (OMURICE)

RECOMMENDED ACCORDING TO PREFERRED GENRE

● "BBBB" (MARTIAL ARTS MOVIE)

*FIG. 16*

| AREA | AREA TYPE | TIME PERIOD | CONGESTION |
|---|---|---|---|
| (122, 33), (126, 33), (126, 40), (122, 40) | XX RAMEN | 08:25～09:35 | AVERAGE OF 20 PERSONS WAITING IN LINE |
| (122, 33), (126, 33), (126, 40), (122, 40) | XX RAMEN | 11:25～14:00 | AVERAGE OF 35 PERSONS WAITING IN LINE |
| (122, 33), (126, 33), (126, 40), (122, 40) | XX RAMEN | 14:00～17:00 | AVERAGE OF 30 PERSONS WAITING IN LINE |

*FIG. 17*

| AREA | AREA TYPE | TIME PERIOD | CONGESTION |
|---|---|---|---|
| (133, 45), (135, 60), (135, 45), (133, 60) | LAN-LAN LAND (AMUSEMENT PARK) | 09:30～11:30 | AVERAGE OF 60 PERSONS PER 10 METERS SQUARE |
| (133, 45), (135, 60), (135, 45), (133, 60) | LAN-LAN LAND (AMUSEMENT PARK) | 11:30～15:00 | AVERAGE OF 80 PERSONS PER 10 METERS SQUARE |
| (133, 45), (135, 60), (135, 45), (133, 60) | LAN-LAN LAND (AMUSEMENT PARK) | 15:00～19:00 | AVERAGE OF 75 PERSONS PER 10 METERS SQUARE |

INFORMATION PROCESSING SYSTEM, INFORMATION PROCESSING DEVICE, INFORMATION PROCESSING METHOD, AND RECORDING MEDIUM

CROSS-REFERENCE TO RELATED APPLICATIONS

This application is a continuation of U.S. application Ser. No. 17/746,612, filed May 17, 2022, which is a continuation of U.S. application Ser. No. 16/631,864, filed Jan. 17, 2020 (now U.S. Pat. No. 11,388,016), which is a National Stage Entry of PCT/JP2018/018318, filed May 11, 2018, which claims priority to Japanese Patent Application No. 2017-145236, filed Jul. 27, 2017, the entire contents of each of which are hereby incorporated by reference in their entirety.

TECHNICAL FIELD

The present disclosure relates to an information processing system, an information processing device, an information processing method, and a recording medium.

BACKGROUND ART

Recently, technologies in which content is distributed according to the circumstances of a user have been proposed. Content distribution according to user circumstances is not limited to the circumstances of the user only, and technologies have also been proposed in which the circumstances of people together with the user are also sensed, and content corresponding to the circumstances is distributed to the user and the people together with the user.

For example, in the case where the user is together with family and friends at home, it is possible to select the content to output according to who the user is with, and it is also possible to output lively content according to according to factors such as an overall excitement level of attendees at a concert venue or the like.

More specifically, for example, Patent Document 1 below discloses a system that distributes beneficial content according to density and mental state (excited state, calm state, and various emotional states).

Also, Patent Document 2 below discloses a system that distributes suitable content according to who is nearby in an area where a plurality of people lives together inside a home.

Also, Patent Document 3 below discloses a technology that recognizes an area that is crowded and an area that is not so crowded, and leads a user from the crowded area to the uncrowded area.

CITATION LIST

Patent Document

Patent Document 1: Japanese Patent Application Laid-Open No. 2014-134922
Patent Document 2: Japanese Patent Application Laid-Open No. 2016-66173
Patent Document 3: PCT Japanese Translation Patent Publication No. 2016-505190

SUMMARY OF THE INVENTION

Problems to be Solved by the Invention

When a user is together with trusted friends, fans of the same artist, people with the same interests, or the like, all of the technologies described above support the fostering of positive feelings by presenting predetermined content, but in actual daily life, many strangers coexist in the same space at the same time in many cases.

For example, in crowded places, such as a long line like at a popular shop or a resort, a packed train during rush hour for work and school, or inside an event hall or train station, a user is often harboring negative emotions, but in such cases has no alternative but to wait for the time to pass while enduring the unpleasant conditions.

Accordingly, the present disclosure proposes an information processing system, an information processing device, an information processing method, and a recording medium capable of distributing special content for relieving a user's negative circumstances.

Solutions to Problems

According to the present disclosure, there is provided an information processing system including: a communication unit configured to receive at least current position information regarding a user; and a control unit configured to cause the communication unit, if the control unit determines that a predetermined area containing a position indicated by the current position information is an area that makes people staying in the predetermined area feel unpleasant, to distribute specific content to the user.

According to the present disclosure, there is provided an information processing device including: a communication unit configured to transmit at least current position information regarding a user to a server; an output unit configured to output specific content acquired through the communication unit from the server that has estimated that a predetermined area containing a position indicated by the current position information is an area that makes people staying in the predetermined area feel unpleasant; and a control unit configured to cause the communication unit to receive the specific content distributed by the server to the user, and also cause the output unit to output the specific content.

According to the present disclosure, there is provided an information processing method, by a processor, including: receiving, through a communication unit, at least current position information regarding a user; and causing the communication unit, if a predetermined area containing a position indicated by the current position information is determined to be an area that makes people staying in the predetermined area feel unpleasant, to distribute specific content to the user.

According to the present disclosure, there is provided a recording medium storing a program for causing a computer to function as: a communication unit configured to transmit at least current position information regarding a user to a server; an output unit configured to output specific content acquired through the communication unit from the server that has estimated that a predetermined area containing a position indicated by the current position information is an area that makes people staying in the predetermined area feel unpleasant; and a control unit configured to cause the communication unit to receive the specific content distributed by the server to the user, and also cause the output unit to output the specific content.

In addition, according to the present disclosure, there is provided an information processing system including: a control unit configured to cause specific content to be distributed to a user if the control unit determines that the user is waiting in a line on the basis of current position information regarding the user.

Effects of the Invention

According to the present disclosure as described above, it becomes possible to distribute special content for relieving a user's negative circumstances.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a block diagram illustrating one example of the configuration of a server according to the embodiment.

FIG. 5 is a diagram illustrating one example of crowded zone information used to determine a crowded area according to the embodiment.

FIG. 10 is a diagram illustrating one example of a content registration screen according to the embodiment.

FIG. 11 is a diagram illustrating one example of a content presentation screen displayed on a user terminal during content distribution according to the embodiment.

FIG. 16 is a diagram illustrating one example of crowded zone information regarding a ramen shop according to the embodiment.

FIG. 17 is a diagram illustrating one example of crowded zone information regarding an amusement park according to the embodiment.

MODE FOR CARRYING OUT THE INVENTION

Figure 1:
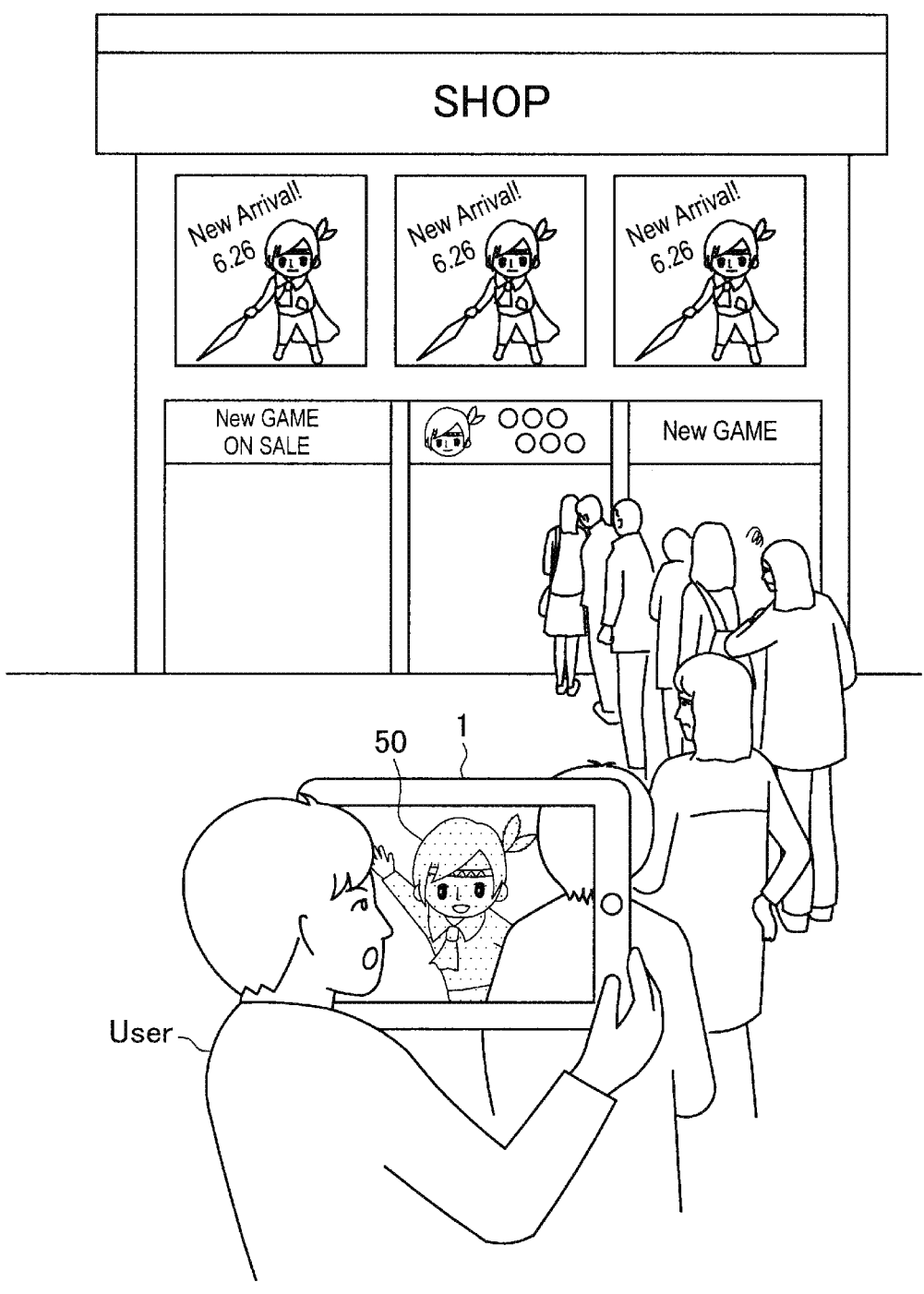
FIG. 1 is a diagram summarizing an information processing system according to one embodiment of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. Overview of information processing system according to one embodiment of present disclosure
2. Configuration
2-1. Configuration of user terminal 1
2-2. Configuration of server 2
3. Registration process
3-1. User registration
3-2. Content registration
4. Distribution of content
4-1. Specific examples of distributed content
4-2. Operating process of content distribution
(4-2-1. First Example: content distribution at location where sensor is not installed)
(4-2-2. Second Example: content distribution at location where sensor is installed)
(4-2-3. Third Example: example of detecting line to distribute content)
5. Conclusion

1. OVERVIEW OF INFORMATION PROCESSING SYSTEM ACCORDING TO ONE EMBODIMENT OF PRESENT DISCLOSURE

FIG. 1 is a diagram summarizing an information processing system according to one embodiment of the present disclosure. The information processing system according to the embodiment is capable of distributing special content for relieving a user's negative circumstances.

For example, as illustrated in FIG. 1, when people have made a long line and are waiting their turn on the release date for a new video game or the like, it is presumed that the people in line will become bored and experience negative emotions. In this case, if the current system detects that a user is waiting in line and distributes special content to the user, it becomes possible to relieve the user's negative circumstances.

The content to be distributed is content such as images, moving images (video; a drama, a motion picture, anime, a short movie, or the like), augmented reality (AR) images, or music, and may be set by a content business in advance. For example, content related to the line in which people are lined up may be distributed. More specifically, AR display information for a character who appears in the game that the user is lining up for may be distributed, and when the user holds up a user terminal 1 such as a tablet as illustrated in FIG. 1, an AR image 50 of the character may be displayed superimposed onto a real image (a through-the-lens image taken by a camera provided in the user terminal 1). With this arrangement, even in cases where the user is waiting in line and experience negative circumstances, the user is able to watch and enjoy the content without simply waiting for the time to pass.

Thus, according to the embodiment, it becomes possible to distribute special content for relieving a user's negative circumstances.

Figure 2:
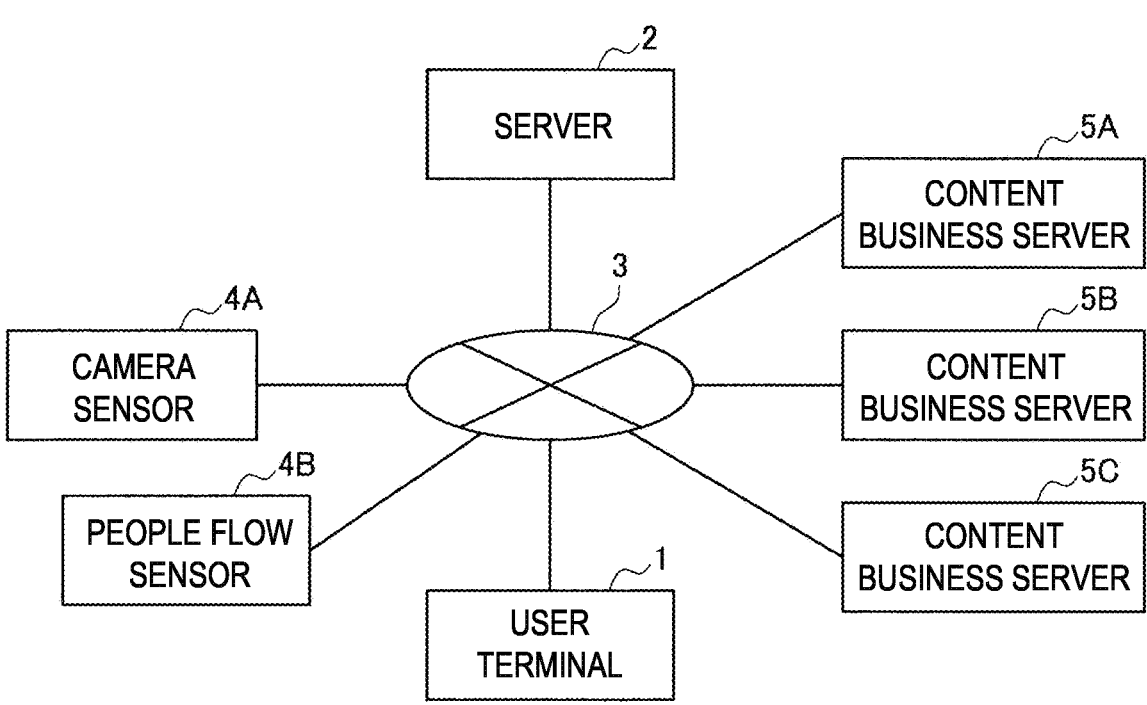
FIG. 2 is a diagram illustrating one example of an overall configuration of the information processing system according to the embodiment.

Next, an overall configuration of such an information processing system according to the embodiment will be described with reference to FIG. 2. FIG. 2 is a diagram illustrating one example of an overall configuration of the information processing system according to the embodiment.

As illustrated in FIG. 2, the information processing system according to the embodiment includes the user terminal 1, a server 2, a camera sensor 4A and a people flow sensor 4B which are examples of sensor devices, and content business servers 5 (5A to 5C).

The user terminal 1 is an information processing terminal used by the user, and is anticipated to be a mobile terminal such as a tablet, a smartphone, a mobile phone, or a laptop personal computer (PC), or a wearable device worn on the user's body (such as an HMD, smart eyeglasses, a smartwatch, a smartband, a smart neckband, a neckband speaker, an earring speaker, or an ear cuff speaker). The user terminal 1 communicably connects to the server 2 through a network 3 to transmit and receive data. For example, the user terminal 1 measures the current position and transmits position information to the server 2. Also, the user terminal 1 receives content from the server 2, and provides the content to the user.

The server 2 controls the distribution of special content according user circumstances. The content to distribute and the conditions for distributing content are preset by the content business servers 5 (5A to 5C).

The server 2 ascertains crowded locations, locations where a line has formed, and the like on the basis of information such as persons and people count information (that is, the number of people) detected by the camera sensor 4A installed in large numbers in a city and terminal count information detected the people flow sensor similarly installed in large numbers in a city, for example. Subsequently, in the case where the user is in a crowded location according to the position information transmitted from the user terminal 1, for example, because it is anticipated that the user is experiencing negative emotions, the server 2 distributes corresponding special content to the crowded zone. In this case, content may be distributed such that only specific users (such as users registered as users of the current system) can receive the content, or such that an unspecified large number of people in the crowded zone can enjoy the content.

The above describes the information processing system according to one embodiment of the present disclosure. Next, a specific configuration of each device included in the information processing system according to the embodiment will be described with reference to the drawings.

2. CONFIGURATION

<2-1. Configuration of User Terminal 1>

Figure 3:
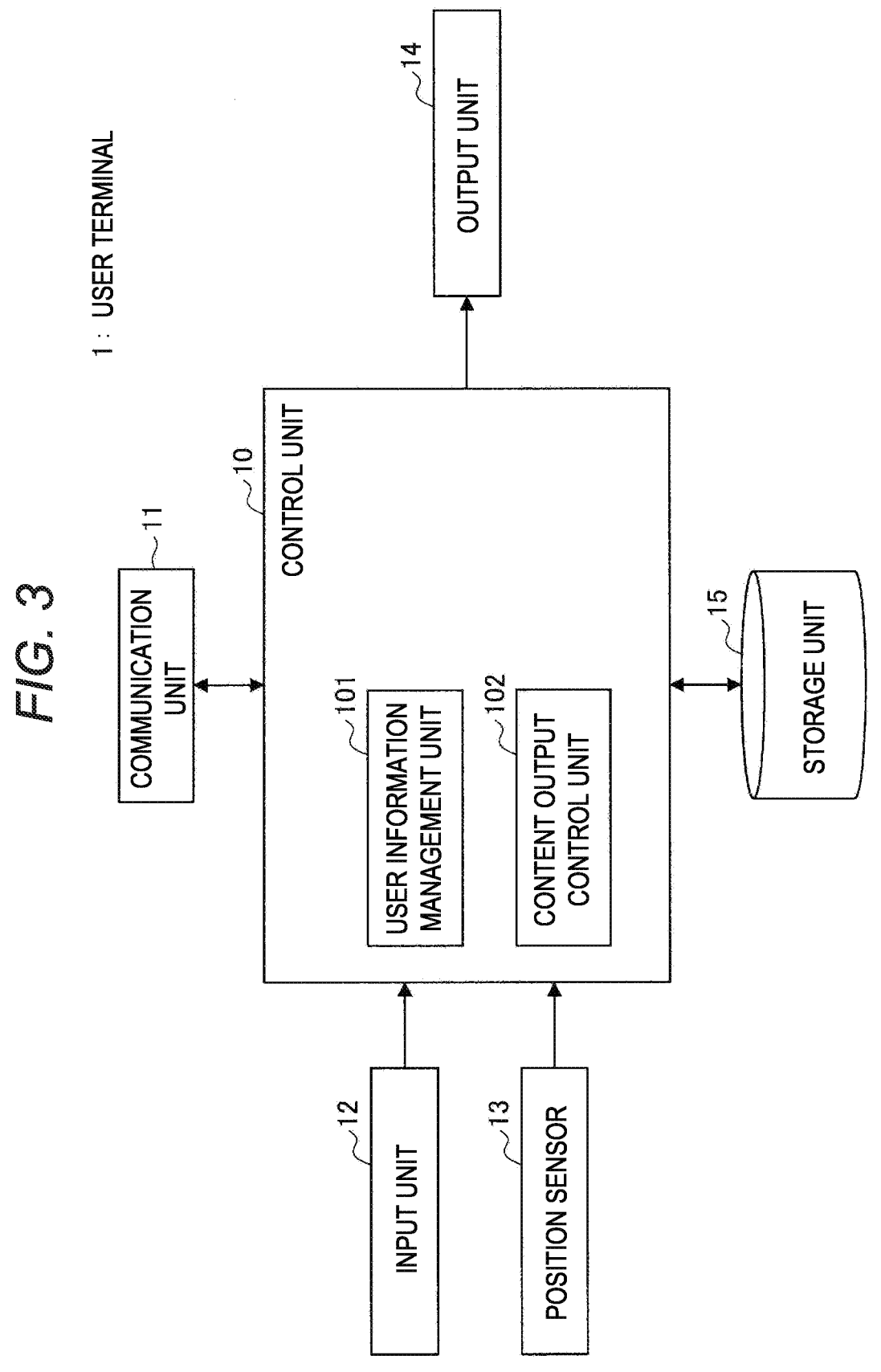
FIG. 3 is a block diagram illustrating one example of the configuration of a user terminal according to the embodiment.

FIG. 3 is a block diagram illustrating one example of a configuration of the user terminal 1 according to the embodiment. As illustrated in FIG. 3, the user terminal 1 includes a control unit 10, a communication unit 11, an input unit 12, a position sensor 13, an output unit 14, and a storage unit 15.

The control unit 10 functions as an operation processing unit and a control unit, and controls the entire operation in the user terminal 1 according to various kinds of programs. The control unit 10 is achieved by an electric circuit such as a central processing unit (CPU) or a microprocessor. Further, the control unit 10 may include read only memory (ROM) that stores programs to be used, operation parameters, etc., and random access memory (RAM) that temporarily stores parameters that change appropriately, etc.

In addition, the control unit 10 according to the embodiment also functions as a user information management unit 101 and a content output control unit 102.

The user information management unit 101 manages user information. Specifically, the user information management unit 101 acquires and stores a user ID and user preference information in the storage unit 15.

The content output control unit 102 controls the output, from the output unit 14, of content received from the server 2 by the communication unit 11.

(Communication Unit 11)

The communication unit 11 connects to the network 3 in a wired or wireless manner, and transmits or receives data with the server 2 over the network. The communication unit 11 communicably connects to the network 3 by a method such as wired/wireless local area network (LAN), Wi-Fi (registered trademark), or a mobile communication network (long term evolution (LTE), the third generation of mobile telecommunications technology (3G)), for example. The communication unit 11 according to the embodiment may continually transmit current position information to the server 2. Also, the communication unit 11 according to the embodiment receives content from the server 2 when it is determined that the current position is contained inside an unpleasant area.

(Input Unit 12)

The input unit 12 receives information input from an external source into the user terminal 1. For example, the input unit 12 may be an operation input unit that receives operation input by a user, or a sound input unit that collects nearby sound. The operation input unit receives an operation instruction given by the user, and outputs the operation content to the control unit 10. The operation input unit may be a touch sensor, a pressure sensor, or a proximity sensor. Alternatively, the operation input unit may be a physical configuration, such as buttons, switches, and levers. Also, the sound input unit is realized by a microphone, a microphone amplifier unit that performs a process of amplifying a sound signal obtained by the microphone, and an A/D converter that digitally converts the sound signal. The sound signal is output to the control unit 10.

Also, the input unit 12 may be any of various types of sensors that acquire user circumstances or surrounding environment information. Specifically, for example, motion sensors (such as an acceleration sensor, a gyro sensor, and a geomagnetic sensor), biological sensors (such as a body temperature sensor, a pulse sensor, a heat rate sensor, a blood pressure sensor, a vein sensor, a perspiration sensor, a respiration sensor, a brain wave sensor, a myoelectric sensor, and a fingerprint sensor), and environmental sensors (such as a temperature sensor, an illuminance sensor, and a humidity sensor) are anticipated.

(Position Sensor 13)

The position sensor 13 includes a function of detecting the current position of the user terminal 1 on the basis of an externally acquired signal. Specifically, for example, the position sensor 13 is realized by a global positioning system (GPS) positioning unit that receives radio waves from GPS satellites, detects the position where the user terminal 1 exists, and outputs the detected position information to the control unit 10. In addition, other than GPS, the position sensor 13 may also detect position by a method such as Wi-Fi (registered trademark), Bluetooth (registered trademark), transmitting or receiving information with a mobile phone, PHS, or smartphone, or by short-range communication, for (Output Unit 14)

The output unit 14 has a function of outputting information to present to the user. For example, the output unit 14 may be realized by a sound output unit and a display unit. The sound output unit includes a speaker that reproduces sound signals and an amplifier circuit for the speaker. The display unit is a display device that outputs screens such as a registration information input screen and various operation screens. The display unit may be, for example, a display device such as a liquid crystal display (LCD) or an organic electroluminescence (EL) display, for example. The output unit 14 according to the embodiment, under control by the content output control unit 102, outputs specific content distributed from the server 2 to present to the user.

(Storage Unit 15)

The storage unit 15 is realized by read only memory (ROM) that stores information such as programs and computational parameters used in processes by the control unit 10, and random access memory (RAM) that temporarily stores information such as parameters that change as appropriate. Also, the storage unit 15 according to the embodiment stores user information such as the user ID.

The above specifically describes a configuration of the user terminal 1 according to the embodiment. Note that the configuration of the user terminal 1 according to the embodiment is not limited to the example illustrated in FIG. 3. For example, part of the configuration may also be provided in an external device.

<2-2. Configuration of Server 2>

FIG. 4 is a block diagram illustrating one example of the configuration of the server 2 according to the embodiment. As illustrated in FIG. 4, the server 2 includes a control unit 20, a communication unit 21, and a storage unit 22.

(Control Unit 20)

The control unit 20 functions as an operation processing unit and a control unit, and controls the entire operation in the server 2 according to various kinds of programs. The control unit 20 is achieved by an electric circuit such as a central processing unit (CPU)) or a microprocessor. Further, the control unit 20 may include read only memory (ROM)) that stores programs to be used, operation parameters, etc., and random access memory (RAM)) that temporarily stores parameters that change appropriately, etc.

Also, the control unit 20 according to the embodiment functions as a content registration unit 201, a user management unit 202, an unpleasant area determination unit 203, and a content distribution control unit 204.

The content registration unit 201 registers information related to content to distribute (also referred to as distribution information) in a content management DB 221 according to a request from each of the content business servers 5. Besides the content data to distribute, the distribution information may also include distribution conditions.

The user management unit 202 uses a user management DB 222 to manage user-related information (registration information). Specifically, the user management unit 202 acquires information such as the name of the user and various profiles from the user terminal 1, and stores the acquired information in the user management DB 222.

The unpleasant area determination unit 203 determines an area estimated to make people staying in the area feel unpleasant. Herein, "unpleasant" refers to negative emotions, and corresponds to "Unpleasant" indicated in Russell's circumplex model of emotion for example. The circumplex model of emotion is indicated by the two-dimensional axes of "Activated/Deactivated" and "Pleasant/Unpleasant".

Specifically, unpleasant (negative) emotions are anticipated to be emotions such as anger, irritation, boredom, and depression. For example, in the case of being in a crowded area (an area in which may people are densely packed together, such as on a crowded train, inside a train station, in a department store, or at an event venue for example) or waiting in a long line, it is anticipated that the user will experience unpleasant emotions due to boredom and irritation.

Consequently, the unpleasant area determination unit 203 is capable of determining whether or not an area is making people feel unpleasant according to the state of crowding (congestion) in the area. Specifically, the unpleasant area determination unit 203 ascertains and determines a crowded area or an area where a long line has formed to be an unpleasant area, on the basis of information such as position information acquired from each user terminal 1, information acquired from the camera sensor 4A, and information acquired from the people flow sensor 4B.

Whether or not an area is a crowded area or an area where a long line has formed is determined according to the following method, for example.

First, by investigating locations and times of day when crowding occurs at popular shops in the city, amusement parks, resorts, and the like to accumulate information in a crowded zone information database (DB) 223, the unpleasant area determination unit 203 can determine whether or not a zone has become an unpleasant area according to the time period. Herein, FIG. 5 illustrates one example of crowded zone information. As illustrated in FIG. 5, times of day when crowding occurs are set for individual areas (an area is specified by a plurality of latitude and longitude points for example, and is a polygonal region enclosed by these points). Also, the congestion during crowded times may also be set. In the example illustrated in FIG. 5, the congestion is expressed by an average number of people in line or by an artificial density. Note that "Area Type" illustrated in FIG. 5 indicates the type of area (what kind of shop, facility, or event).

Next, a method is also conceivable in which the camera sensor 4A and the people flow sensor 4B installed in each location, such as in the city and at event venues, are used to determine if the location is actually crowded or a line has actually formed. People count information and line-related information are transmitted from the camera sensor 4A and the people flow sensor 4B to the server 2 as congestion information related to the congestion.

Figures 6, 7:
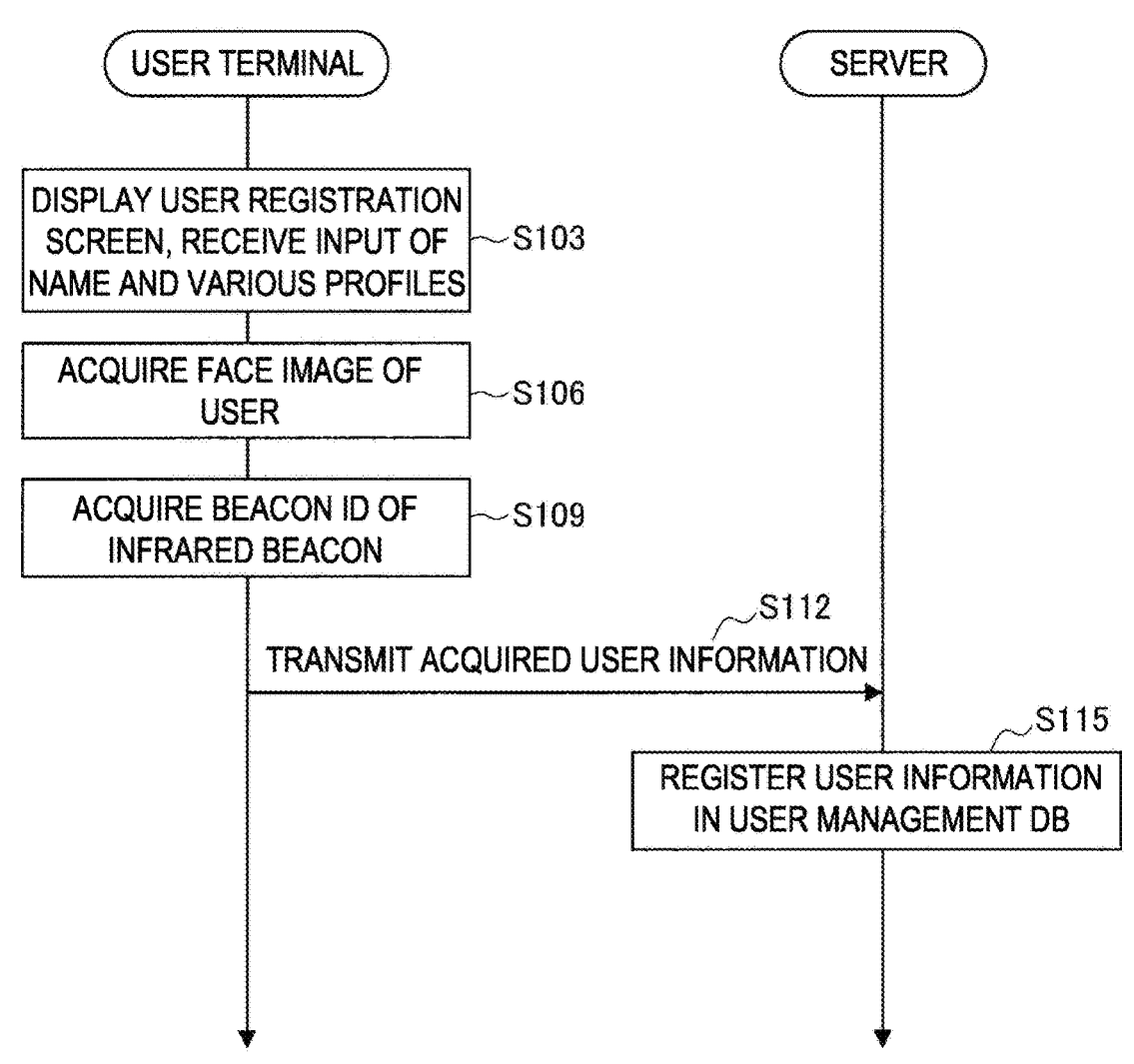
FIG. 6 is a diagram explaining the detection of persons by a camera sensor according to the embodiment.
FIG. 7 is a flowchart illustrating an operating process for user registration according to the embodiment.

The camera sensor 4A is provided with a motion capture function (person detection unit) that detects human shapes from a captured image, and thereby can detect persons present nearby. FIG. 6 is a diagram explaining the detection of persons by the camera sensor 4A. For example, as illustrated on the left side of FIG. 6, the camera sensor 4A detects parts of the human body such as the head, hands, arms, and legs from a captured image 40, and on the basis of how each part is moving, estimates posture and detects a person. With this arrangement, the camera sensor 4A can transmit information related to detected persons and a people count to the server 2. Also, as illustrated on the right side of FIG. 6, the camera sensor 4A is also capable of detecting a plurality of persons from a captured image 41, and from the posture and direction in which the persons are facing, recognize that the persons are lined up, and detect the line. Additionally, the camera sensor 4A can also acquire the length of the line through shape detection of the persons.

Also, by performing face recognition on a captured image acquired from the camera sensor 4A, it is also possible to determine whether or not a target user is waiting in one of these lines. In this case, a face image of the user is registered in the user management DB 222 in advance. Alternatively, it is possible to use a device such as an infrared beacon worn on the user's body to make a determination on the basis of a user ID (beacon ID) emitted from the beacon. Also, by determining where the user is positioned in the line, the server 2 also becomes capable of computing the remaining wait time.

The people flow sensor 4B can receive radio waves to ascertain the number of user terminals existing nearby. For example, the people flow sensor 4B includes a Wi-Fi radio wave detection unit that intercepts Wi-Fi radio waves emitted from Wi-Fi terminals such as smartphones carried by users, and on the basis of the Wi-Fi radio wave detection results, the people flow sensor 4B can detect how many users are present nearby. The people flow sensor 4B transmits information regarding the detected number of terminals to the server 2.

Note that the server 2 may also record measurement values such as actual people counts and lengths of lines transmitted from the camera sensor 4A and the people flow sensor 4B in this way to the crowded zone information DB 223 as crowding information, and further raise the accuracy of the crowding information. Note that in the case where current position information is transmitted from each user terminal 1 to the server 2, the server 2 can ascertain the state of crowding (how many people there are) in each zone on the basis of the current position information from each user terminal 1.

Although the above specifically describes the determination of an unpleasant area, the embodiment is not limited thereto, and the server 2 may also determine an unpleasant area by directly detecting the emotions of persons present in a specific area. For example, the server 2 may determine an unpleasant area on the basis of whether or not a user is experiencing unpleasant emotions, on the basis of information detected by various sensors in the user terminal 1 carried by the user. More specifically, in a case in where a vibration sensor senses that the user is shaking with a fixed short rhythm, such as when "nervously jiggling one's legs", or in a case where a microphone senses the sound of "clicking one's tongue", "sighing", or "yawning", the user is experiencing unpleasant emotions (such as anger, irritation, boredom, or depression), and therefore the area where the user is present is determined to be an unpleasant area. Also, in a case where the microphone continues to sense a situation in which no speech is emitted (in other words, silence) for a long period of time even through the user is engaged in activity with someone else, the server 2 can determine that the user is experiencing unpleasant emotions. In addition, it is also possible to use a biological sensor to sense the user's physical condition, such as a rising of the heart rate or a falling of the skin temperature, and thereby determine that the user is displeased. In addition, it is also possible to use a biological sensor to sense the user's physical condition, such as a rising of the heart rate, a falling of the skin temperature, or a "change in brain waves", and thereby determine that the user is displeased.

The content distribution control unit 204 distributes corresponding content registered in the content management DB 221 to a specified or unspecified large number of users present in a location determined to be an unpleasant area by the unpleasant area determination unit 203, or to users waiting in line in an unpleasant area. The position of a user may be ascertained on the basis of position information transmitted from the user terminal 1. Because users staying in an unpleasant area are presumed to be experiencing negative emotions, distributing content makes it possible to relieve the negative circumstances and enable the users to have fun. Note that because special content is obtained when users are present in a crowded area or waiting in line according to the embodiment, it is anticipated that the emotions of the users will change to positive emotions (pleasant circumstances), but the content distribution control unit 204 distributes content in the case where users are present in a crowded location or waiting in line, regardless of the actual emotions of the individual users. For example, when content is distributed to a user actually harboring unpleasant emotions according to the method described above from among the users staying in an unpleasant area, when the same user is staying in the same unpleasant area again, the content may be distributed regardless of that user's emotions.

Note that the content distribution control unit 204 may also distribute corresponding content in the case where a predetermined condition regarding the time period, degree of crowding, or the like is additionally satisfied. A predetermined condition is a condition on content distribution preset by a content business, and can be specified according to parameters such as location, type of zone (such as specific shops, facilities, or events), time period, and crowding, for (Communication Unit 21)

The communication unit 21 connects to the network 3 in a wired or wireless manner, and transmits or receives data with each user terminal 1 through the network 3. The communication unit 21 communicably connects to the network 3 by a method such as wired/wireless local area network (LAN) or wireless fidelity (Wi-Fi (registered trademark)). For example, the communication unit 21 according to the embodiment receives current position information from the user terminal 1, and receives sensor data or analysis results based on sensor data (such as people count information and terminal count information) from the camera sensor 4A and the people flow sensor 4B. Also, the communication unit 21, under control by the content distribution control unit 204, causes content to be transmitted to a predetermined user terminal 1.

(Storage Unit 22)

The storage unit 22 is realized by ROM that stores information such as programs and computational parameters used in processes by the control unit 20, and RAM that temporarily stores information such as parameters that change as appropriate. For example, the storage unit 22 according to the embodiment stores the content management database (DB) 221, the user management DB 222, and the crowded zone information DB 223.

The content management DB 221 stores content-related information registered by content businesses, such as content and distribution conditions.

The user management DB 222 stores user information including information such as the names of users, user IDs, and profiles.

The crowded zone information DB 223 stores information related to crowded zones as illustrated in FIG. 5.

The above specifically describes a configuration of the server 2 according to the embodiment. Note that the configuration of the server 2 illustrated in FIG. 4 is one example, and the embodiment is not limited thereto. For example, at least part of the configuration of the server 2 may also be in an external device, and at least part of each function of the control unit 20 may also be realized by the user terminal 1 or by an information processing terminal a relatively short communication distance away from the user terminal 1 (such as what is called an edge server, for example). In this way, by appropriately distributing each configuration element of the server 2, it becomes possible to improve real-time performance, reduce the processing load, and furthermore guarantee security. Also, each configuration element and each DB of the control unit 20 illustrated in FIG. 4 may all be provided in the user terminal 1, and the information processing system according to the embodiment may be executed by an application on the user terminal 1.

3. REGISTRATION PROCESS

Next, a registration process in the information processing system according to the embodiment will be described specifically using the drawings.

<3-1. User Registration>

FIG. 7 is a flowchart illustrating an operating process for user registration. As illustrated in FIG. 7, first, the user terminal 1 displays a user registration screen and receives the input of the user's name and various profiles (step S103).

Next, the user terminal 1 acquires a face image of the user (step S106), and also acquires a beacon ID of an infrared beacon if carried by the user (step S109).

Figure 8:
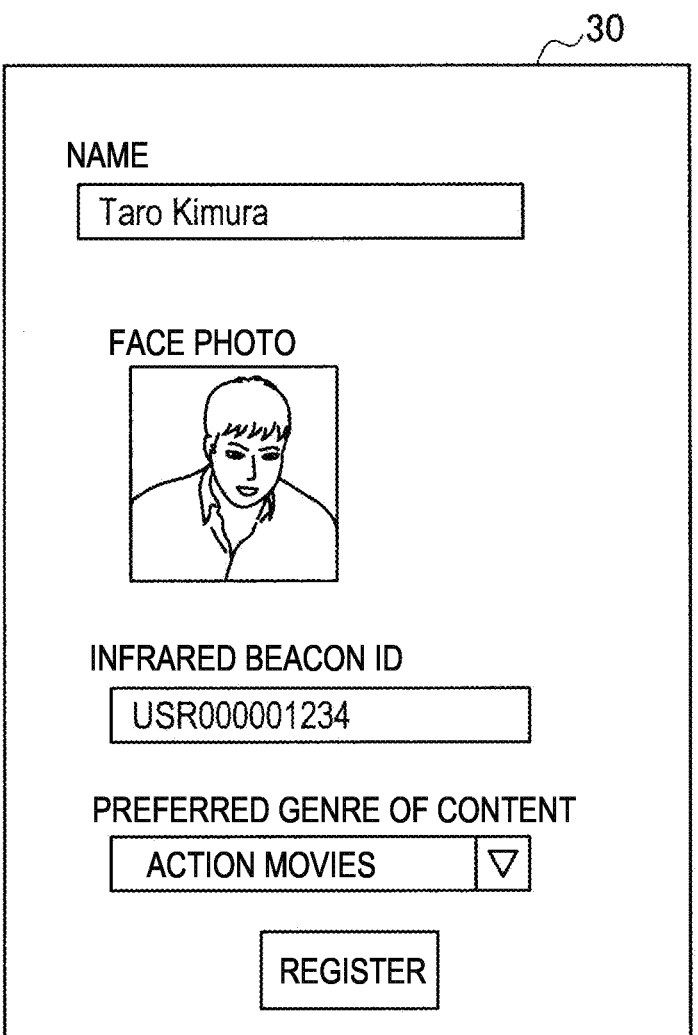
FIG. 8 is a diagram illustrating one example of a user registration screen according to the embodiment.

Here, one example of the user registration screen at this point is illustrated in FIG. 8. As illustrated in FIG. 8, on a user registration screen 30, fields for registering the name, face photo, infrared beacon ID, and preferred content genre are displayed. The face photo and the infrared beacon ID are used when determining whether or not the user is actually waiting in line.

Next, the user terminal 1 transmits the acquired user information to the server 2 (step S112).

Subsequently, the user management unit 202 of the server 2 registers the received user information in the user management DB 222 (step S115). At this time, the user management unit 202 manages the user information by assigning a unique user ID.

The above describes the user registration process. Note that user registration is not a requirement to enjoy content distribution according to the embodiment, and it is possible to distribute corresponding content to users who have not performed user registration when such users are present in an unpleasant area.

<3-2. Content Registration>

Next, the registration of content by a content business will be described with reference to FIG. 9. A content business can register, in the server 2, special content to be distributed in cases where a predetermined zone becomes crowded or a line forms. The content registered for distribution may also double as advertising.

Figure 9:
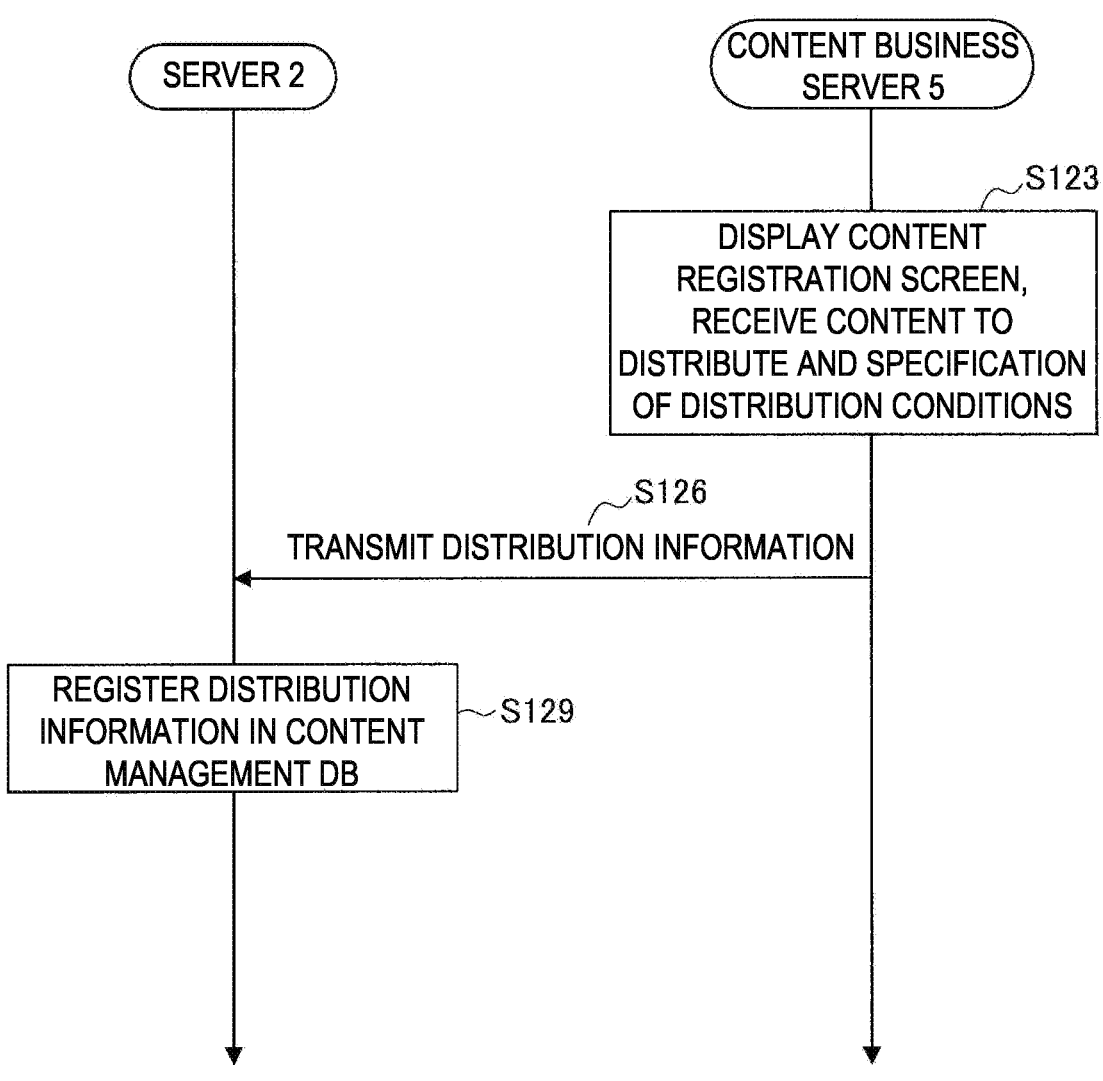
FIG. 9 is a flowchart illustrating an operating process for content registration according to the embodiment.

FIG. 9 is a flowchart illustrating an operating process for content registration. As illustrated in FIG. 9, first, one of the content business servers 5 displays a content registration screen with respect to the content business, and receives a specification of content to distribute and distribution conditions (step S123).

Here, one example of the content registration screen at this point is illustrated in FIG. 10. As illustrated in FIG. 10, on a content registration screen 35, it is possible to specify content distribution conditions and register content to distribute. Anticipated examples of conditions for distributing content include the following.

Zone section information (a polygonal area enclosed by a plurality of latitude and longitude points)

Zone type (such as ramen shop or amusement park)

Time period, such as year, month, day, hour, minute, and day of the week

Congestion (such as 5 or more people waiting in line)

Additionally, whether or not to distribute content only to registered users can also be selected.

Next, the content business server 5 transmits the input distribution information to the server 2 (step S126).

Subsequently, the content registration unit 201 of the server 2 registers the received distribution information in the content management DB 221 (step S129).

The above specifically describes the process of registering content to distribute.

4. DISTRIBUTION OF CONTENT

Next, the distribution of content will be described specifically using the drawings.

4-1. Specific Examples of Distributed Content

As described above, when the server 2 determines that a zone is crowded or that a line has formed on the basis of preregistered crowding information for each zone or information actually detected by the camera sensor 4A and the people flow sensor 4B for example, content to distribute with conditions matching the state of crowding in the zone is distributed in the case where such content has been registered.

Also, in the case where user registration is performed, when it is determined that a user is present in a crowded zone or is waiting in line on the basis of position information regarding each user transmitted from the user terminal 1 and a face analysis result of a captured image acquired by a nearby camera sensor 4A, the server 2 may distribute corresponding content to the user terminal 1.

In the case of a user who has performed user registration, benefits like the following may be provided.

The user becomes able to view or listen to content specified to "distribute only to registered users".

The user is able to resume viewing or listening to the content from last time.

If the user is waiting in a line, content that fits into the remaining wait time is recommended.

Content matching a registered preferred genre is recommended.

Herein, FIG. 11 illustrates one example of a content presentation screen displayed on the user terminal 1 during content distribution. As illustrated in FIG. 11, on a content presentation screen 37, "General Content" that is also distributed to unregistered users and "Content for Premium Users" that is distributed only to registered users are presented. The "Content for Premium Users" may also be visible only to registered users. In "Content for Premium Users", content viewable/listenable by premium users, content that can be continued from the last time, content that is recommended given the remaining wait time in line, and content that is recommended according to the user's preferred genre are presented. The user is able to select any of the content for viewing or listening on the user terminal 1.

Next, in cases such as waiting in line at a theme park attraction or restaurant, waiting in line for a specific video game at a game shop, or waiting in line for a specific event, it is possible to present not only video content, but also bonus content in which a character related to the line, such as a related theme park character, video game character, or event character, appears for the user waiting in line.

For example, a character may be made to appear on the user terminal 1 carried by the user, on signage installed near the line, or the like. The description hereinafter will refer to FIGS. 12 to 15.

Figure 12:
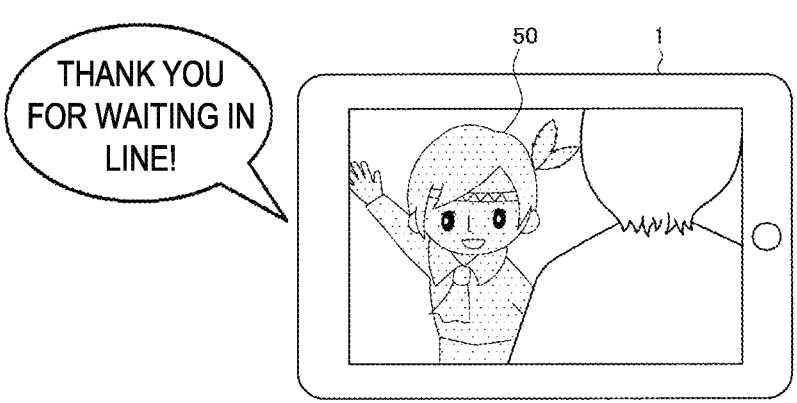
FIG. 12 is a diagram explaining an example of character content distribution (user terminal) according to the embodiment.

FIG. 12 is a diagram explaining an example of character content distribution according to the embodiment. As illustrated in FIG. 12, an AR image 50 of a character is displayed on the user terminal 1, and may be displayed superimposed onto a real image. Additionally, a comment such as "Thank you for waiting in line!" may be output in the voice of the character.

Figure 13:
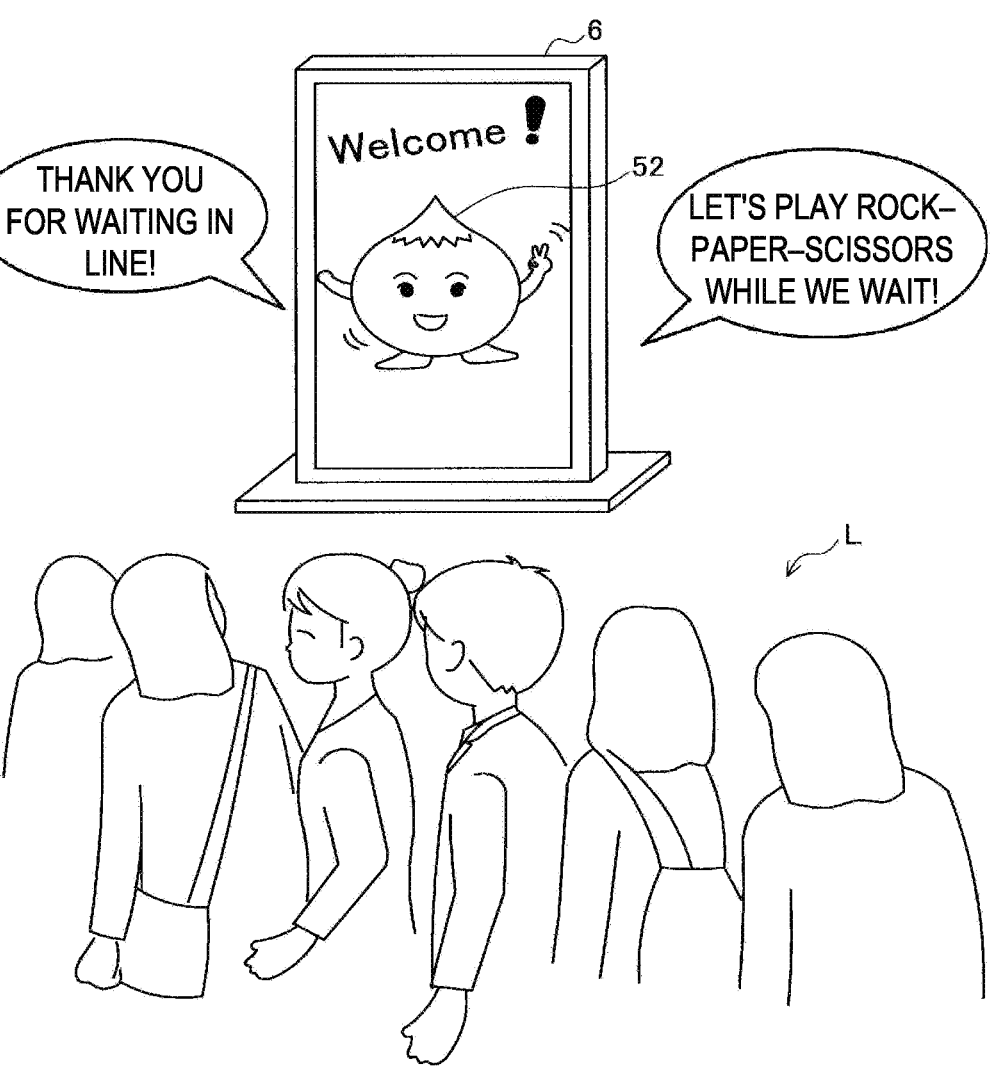
FIG. 13 is a diagram explaining an example of character content distribution (signage) according to the embodiment.

FIG. 13 is a diagram explaining a case of distributing character content on signage. For example, in the case where a line is detected at a user's current position, the server 2 distributes content to a display device such as signage installed near the line. In other words, as illustrated in FIG. 13, it is possible to make a character 52 appear on a signage device 6 installed near a line L, output a message such as "Thanks for waiting in line!" in the voice of the character, and keep people from becoming bored while waiting in line. In this case, content can be distributed equally not only to registered users but to all nearby users.

Note that content may also be distributed from the signage device 6 to a nearby user terminal 1. For example, it is possible to distribute content from the signage device 6 to a nearby user terminal 1 by Wi-Fi Direct or short-range wireless communication. Also, rather than the signage device 6, a communication device (hotspot) capable of distributing content directly to a nearby user terminal 1 may be installed, and specific content for relieving negative circumstances may be distributed from the communication device to a nearby user terminal 1 when the area is determined to be an unpleasant area. In this case as well, content can be distributed equally not only to registered users but to all nearby users.

Figure 14:
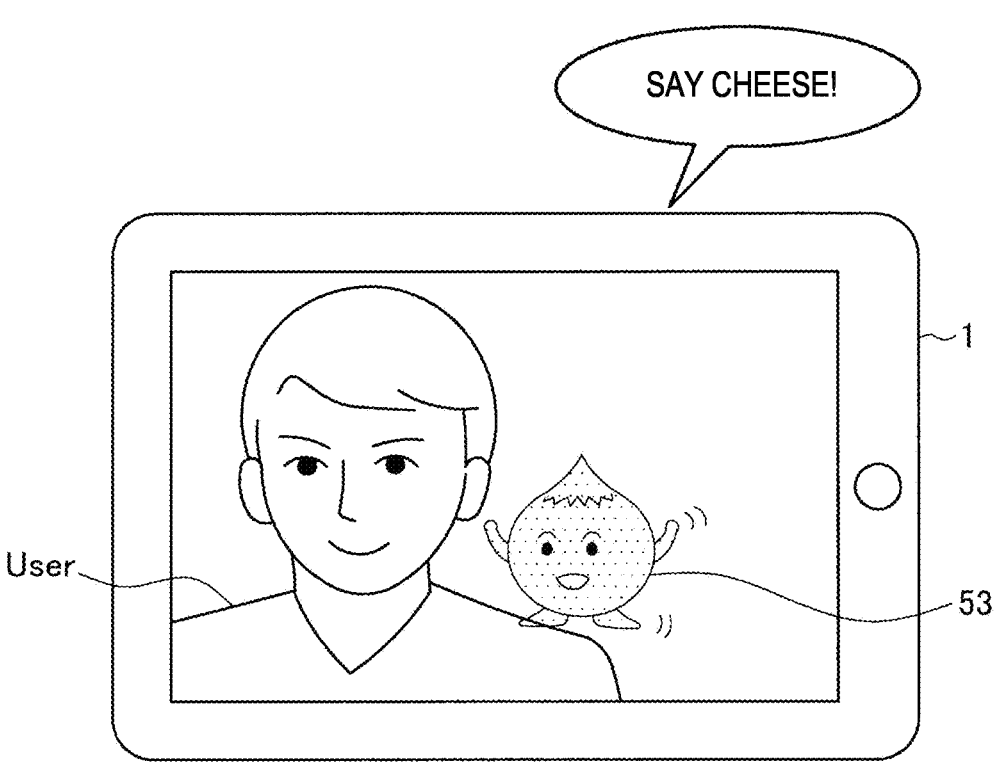
FIG. 14 is a diagram explaining an example of character content distribution (two shot) according to the embodiment.

FIG. 14 is a diagram explaining a usage example of the case where a character is displayed by AR. As illustrated in FIG. 14, in the case where a character is displayed by AR on the user terminal 1, the user is able to perform an action such as taking a two shot of the user him- or herself with an AR image 53 of the character.

Figure 15:
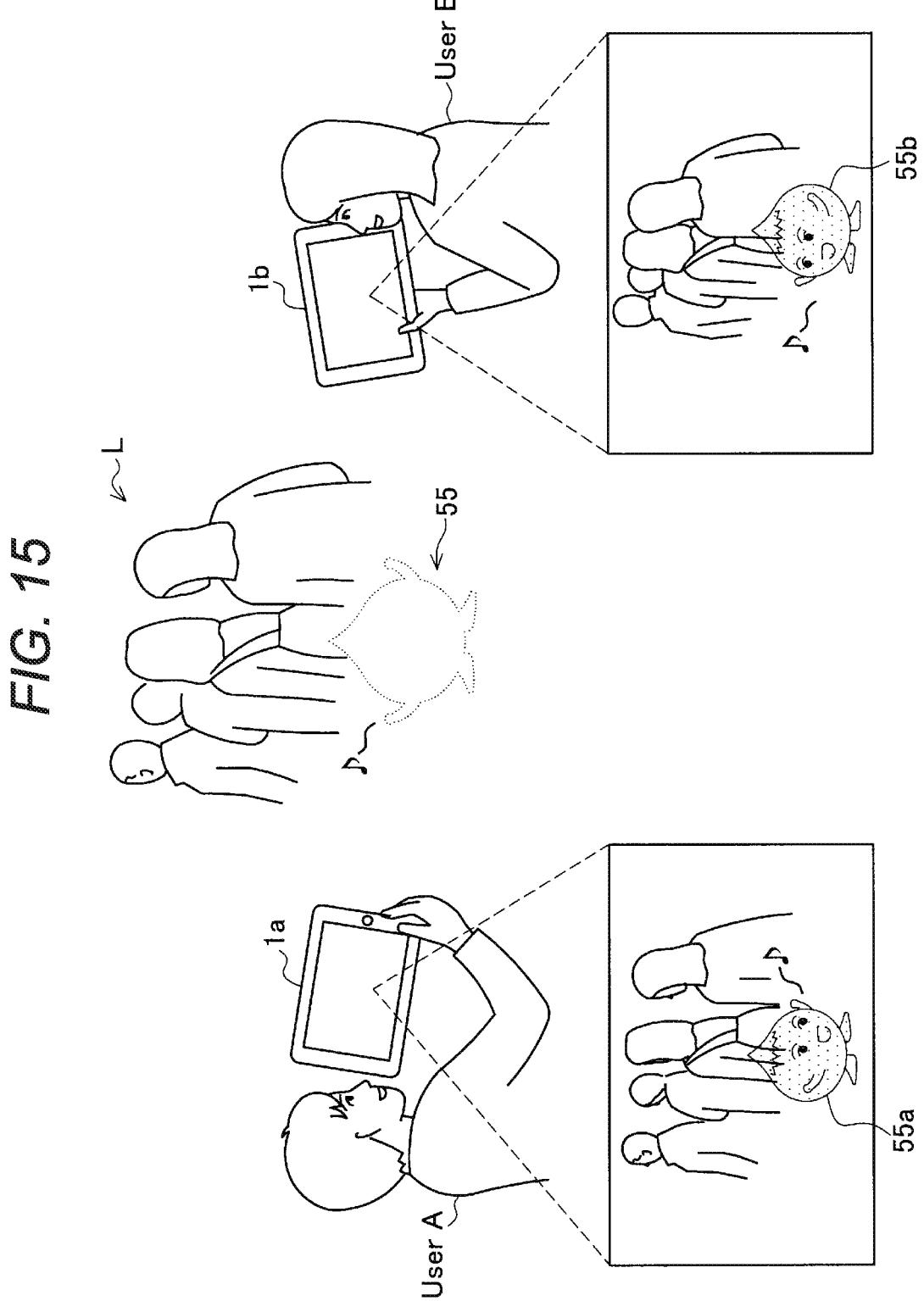
FIG. 15 is a diagram explaining an example of character content distribution (3D content) according to the embodiment.

FIG. 15 is a diagram explaining a case of distributing three-dimensional (3D) content as an instance of AR content. For example, in the case where precise positioning in units of centimeters is possible with the use of technology such as ultra-wideband (UWB) wireless communication, accurate control of the display position and direction of AR content according to the position of each user and the direction in which the user is pointing a camera of the user terminal 1 such as a smartphone becomes possible. As illustrated in FIG. 15 for example, the same character can be displayed (3D content presented as a 2D image) on the user terminals 1*a* and 1*b* of a plurality of users. In this case, by adjusting the display position and direction of the 3D content such as a character according to the position and camera direction of each user, and by controlling the playback of movements and speech by the same characters 55*a* and 55*b* at the same time on the user terminals 1*a* and 1*b* of the plurality of users, the fusion with the real space becomes more realistic, and a shared experience among a plurality of users becomes possible.

Also, in cases where user registration is performed, it is also possible to display the character on only the user terminal of a user or voice a comment matching the user's circumstances (such as "This is the third time you've lined up for this today!") according to an activity pattern of the user, such as the number of times or the amount of time that the user has been waiting in line.

4-2. Operating Process of Content Distribution

Next, an operating process of content distribution will be described using a plurality of Examples.

4-2-1. First Example: Content Distribution at Location where Sensor is not Installed First, content distribution in a location where the camera sensor 4A and the people flow sensor 4B are not installed will be described. In this case, the server 2 distributes content on the basis of preregistered crowded zone information.

For example, in a case where the state of crowding is acquirable in advance, such as at a popular ramen shop or an amusement park, by registering crowded time periods and time periods when a line forms as the crowded zone information, the server 2 can determine unpleasant areas.

Herein, FIG. 16 illustrates one example of crowded zone information for a ramen shop. As illustrated in FIG. 16, congestion information is registered for respective time periods for the area of a popular ramen shop for example. Specifically, for a morning time period, an average of 20 persons waiting in line is registered, while for a lunch time period, an average of 35 persons waiting in line is registered, and for an afternoon time period, an average of 30 persons waiting in line is registered. With this arrangement, the unpleasant area determination unit 203 of the server 2 can determine that the area is an unpleasant area during the registered time periods. In addition, the content distribution control unit 204 controls the distribution of corresponding content on the basis of the registered congestion.

Herein, FIG. 17 illustrates one example of crowded zone information for an amusement park. As illustrated in FIG. 17, the congestion is also registered for respective time periods for an amusement park. The unpleasant area determination unit 203 of the server 2 can determine that the area is an unpleasant area during the registered time periods. In addition, the content distribution control unit 204 controls the distribution of corresponding content on the basis of the registered congestion.

(Operating Process)

Figure 18:
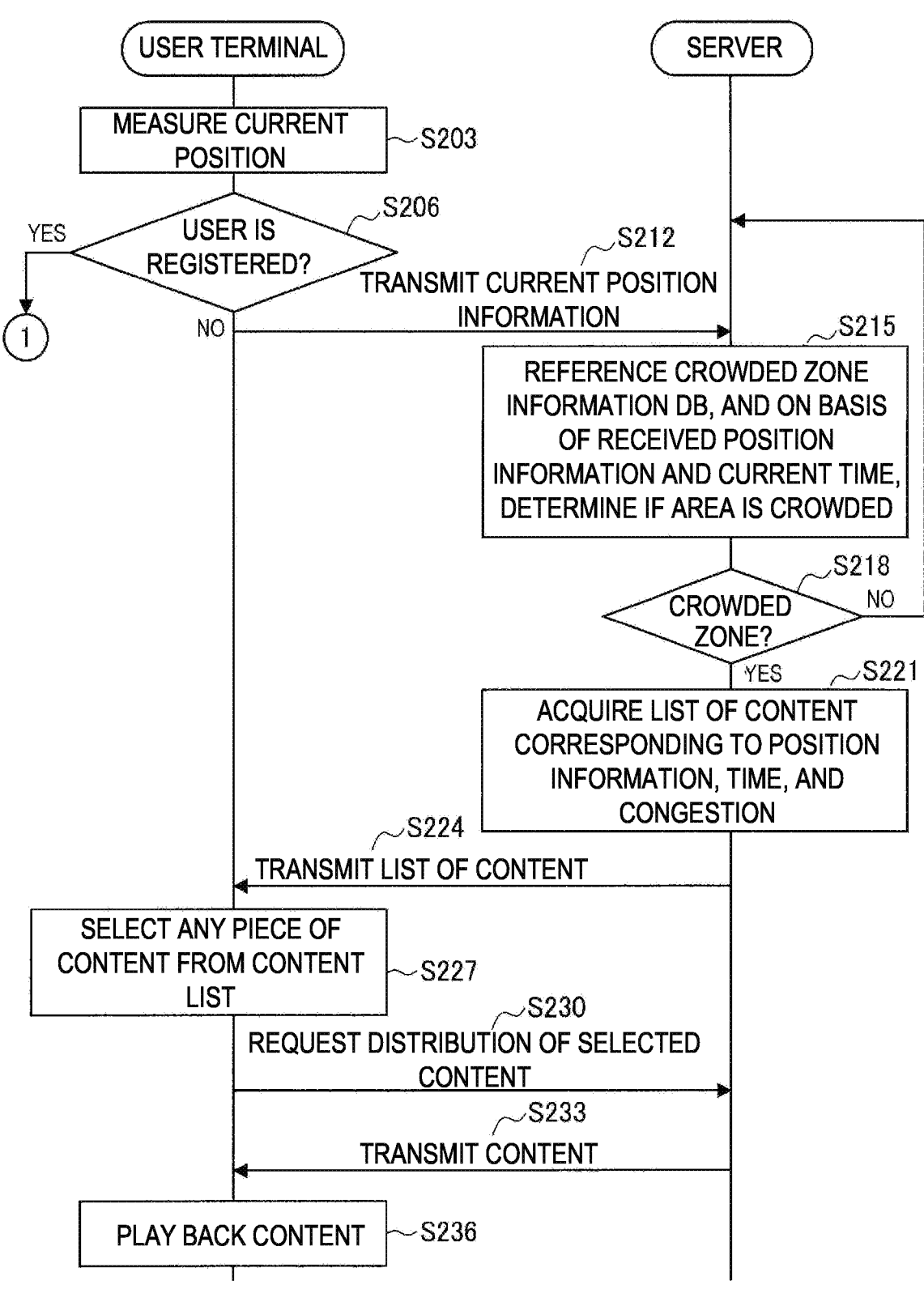
FIG. 18 is a sequence diagram illustrating a content distribution process according to a First Example of the embodiment.
Figure 19:
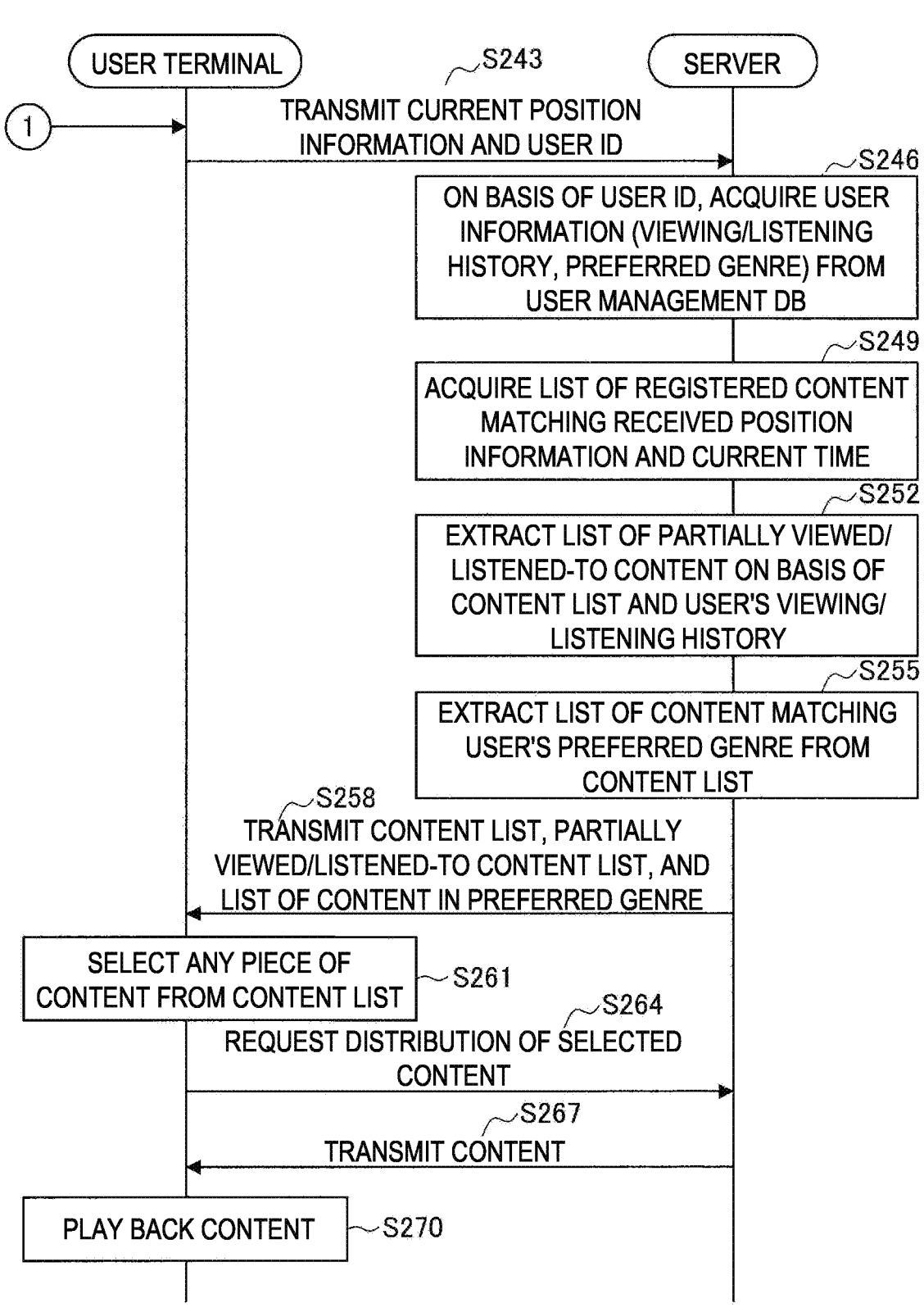
FIG. 19 is a sequence diagram illustrating a content distribution process according to the First Example of the embodiment.

Next, an operating process according to the present Example will be described with reference to FIGS. 18 and 19. FIGS. 18 and 19 are sequence diagrams illustrating a content distribution process according to a First Example of the embodiment.

As illustrated in FIG. 18, first, the user terminal 1 measures the current position (step S203).

Next, if the user is unregistered (step S206/No), the user terminal 1 transmits current position information to the server 2 (step S212). Note that the measurement and transmission of the current position to the server 2 may be executed by a dedicated application installed in the user terminal 1.

Next, the unpleasant area determination unit 203 of the server 2 references the crowded zone information DB 223 and determines whether or not the location where the user is currently present is crowded on the basis of the received position information and the current time (step S215). For example, in the case where the user's current position is inside the area of the ramen shop illustrated in FIG. 16 and the current time is 9:00, because the area is registered as a crowded zone, the unpleasant area determination unit 203 determines that the area is crowded (a crowded zone).

Next, in the case of determining that the area is a crowded zone (step S218/Yes), the content distribution control unit 204 acquires a list of content corresponding to the position information, the time, and the congestion from the content management DB 221 (step S221), and transmits the acquired list of content (content list) to the user terminal 1 (step S224). For example, in the case where distribution information is registered to indicate that certain content is to be distributed when the congestion is an "average of 20 persons or more waiting in line" in the "ramen shop area", the content distribution control unit 204 acquires a list of the relevant content in accordance with the distribution conditions.

Next, the user terminal 1 selects any piece of content from the content list (step S227), and requests the server 2 to distribute the selected content (step S230). For example, the user terminal 1 may display the content presentation screen 37 as illustrated in FIG. 11 to enable the user to select any piece of content from the content list. Note that the "Content for Premium Users" illustrated in FIG. 11 is not displayed at this point.

Subsequently, the server 2 transmits content according to the request (step S233), and the content is played back on the user terminal 1 (step S236).

Next, FIG. 19 will be referenced to describe content distribution in the case where the user is registered.

In the case where the user is registered (step S206/Yes), the user terminal 1 transmits the current position information and user ID to the server 2 (step S243). Note that the measurement of the current position and the transmission of the current position and the user ID to the server 2 may be executed by a dedicated application installed in the user terminal 1.

Next, the content distribution control unit 204 of the server 2 acquires user information (such as a viewing/listening history and a preferred genre) from the user management DB 222 on the basis of the user ID (step S246).

Next, the content distribution control unit 204 acquires a list of registered content that matches the received position information and the current time (step S249). For example, in the case where the user's current position is inside the "ramen shop area" and the congestion at the current time is an "average of 20 persons or more waiting in line", a list of distributable content matching such conditions is acquired in accordance with the distribution information registered in the content management DB 221.

Next, the content distribution control unit 204 extracts a list of partially viewed/listened-to content on the basis of the acquired content list and the user's viewing/listening history (step S252). For example, partially viewed/listened-to content can be grasped because a viewing/listening history of content that was distributed and viewed or listened to by the user when the user waited in line previously is registered in the user management DB 222. Note that in addition to the partial playback of a movie or drama show, partial viewing/listening is also used to refer to being midway through a series for content that is created in series, such as Season 2 in the case where the user has finished viewing or listening to Season 1.

Also, the content distribution control unit 204 extracts a list of content matching the user's preferred genre from out of the acquired content list (step S255).

The extraction of a partially viewed/listened-to content list and the extraction of a content list matching a preferred genre described above are positioned as premium services performed for registered users.

Next, the content distribution control unit 204 transmits the acquired content list, the partially viewed/listened-to content list, and the list of content in the preferred genre to the user terminal 1 (step S258).

Next, the user terminal 1 selects any piece of content from each content lists (step S261), and requests the server 2 to distribute the selected content (step S264). For example, the user terminal 1 may display the content presentation screen 37 as illustrated in FIG. 11 to enable the user to select any piece of content from the content list. As illustrated in FIG. 11, the partially viewed/listened-to content list ("Resume viewing/listening", and the content list matching the preferred genre ("Recommended according to preferred genre") may be presented for premium users (registered users). The "Viewable/listenable content" corresponds to the content registered as "distribute only to registered users" in the content registration by the business side described with reference to FIG. 10, and is included in the content list acquired in the above step S249. Note that "Recommended according to remaining time in line" illustrated in FIG. 11 is not displayed at this point, and will be described in the Third Example.

Subsequently, the server 2 transmits content according to the request (step S267), and the content is played back on the user terminal 1 (step S270).

4-2-2. Second Example: Content Distribution at Location where Sensor is Installed Next, a Second Example will be described. In the Second Example, a case will be described in which the camera sensor 4A and the people flow sensor 4B are installed in locations such as a shopping area, a resort, or inside a commuter train car, and the congestion is actually measured on the basis of data from these sensors. For example, the camera sensor 4A and the people flow sensor 4B are provided inside a train, making it possible to count the number of passengers (people getting on and off) and compute the congestion on the train. Sensor data is transmitted to the server 2 as needed.

In the case where a user is present in a crowded zone on the basis of a crowded zone determination result based on current position information transmitted from the user terminal 1 and the above sensor data, because the user is presumed to be experiencing negative circumstances, the server 2 can distribute corresponding content and thereby alleviate the negative circumstances. Note that in the case where there are many users of this system, current positions will be transmitted continually from a large number of users, and therefore the server 2 is also capable of computing the congestion of each zone on the basis of the position information from all users.

Figure 20:
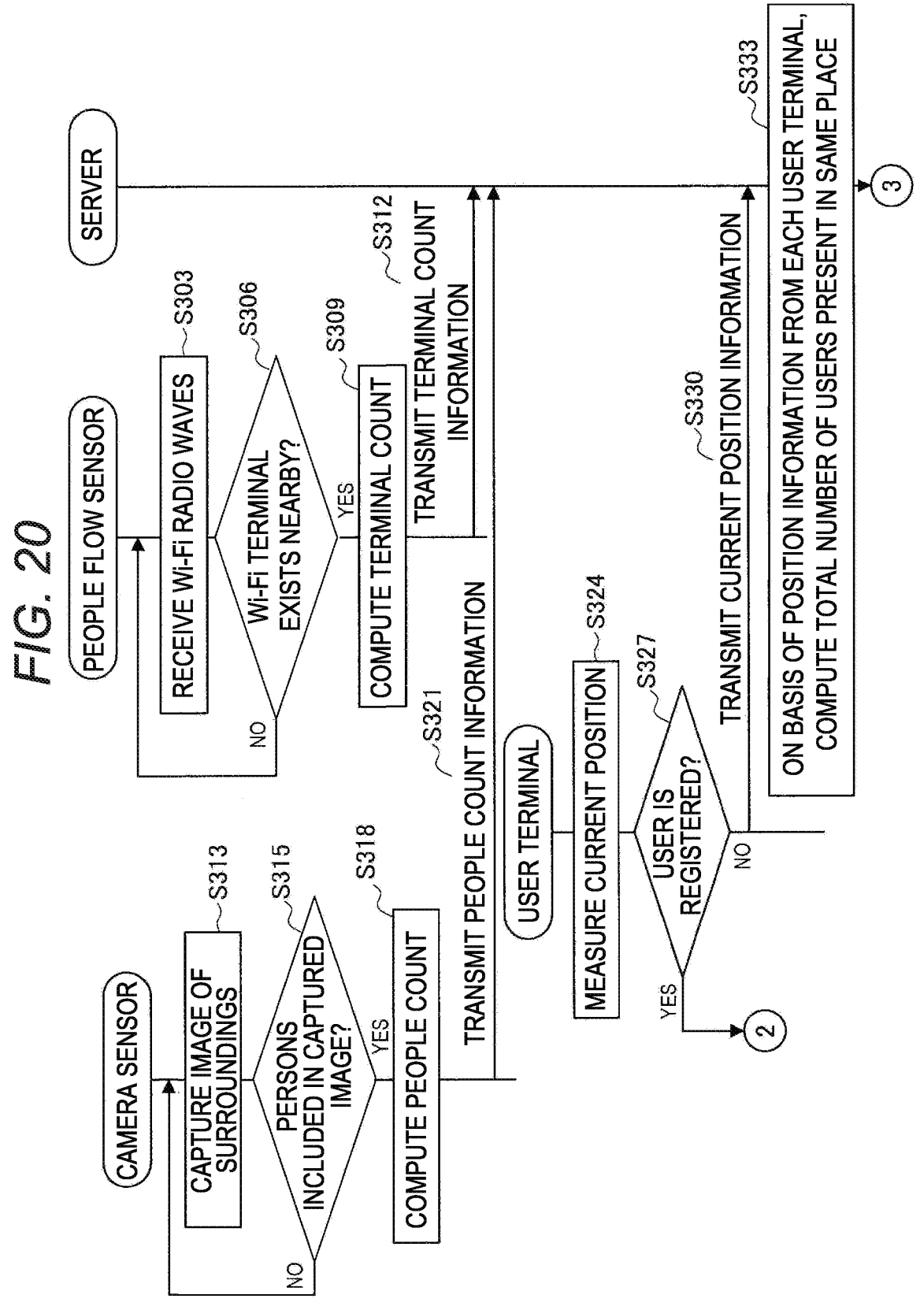
FIG. 20 is a sequence diagram illustrating a content distribution process according to a Second Example of the embodiment.
Figure 21:
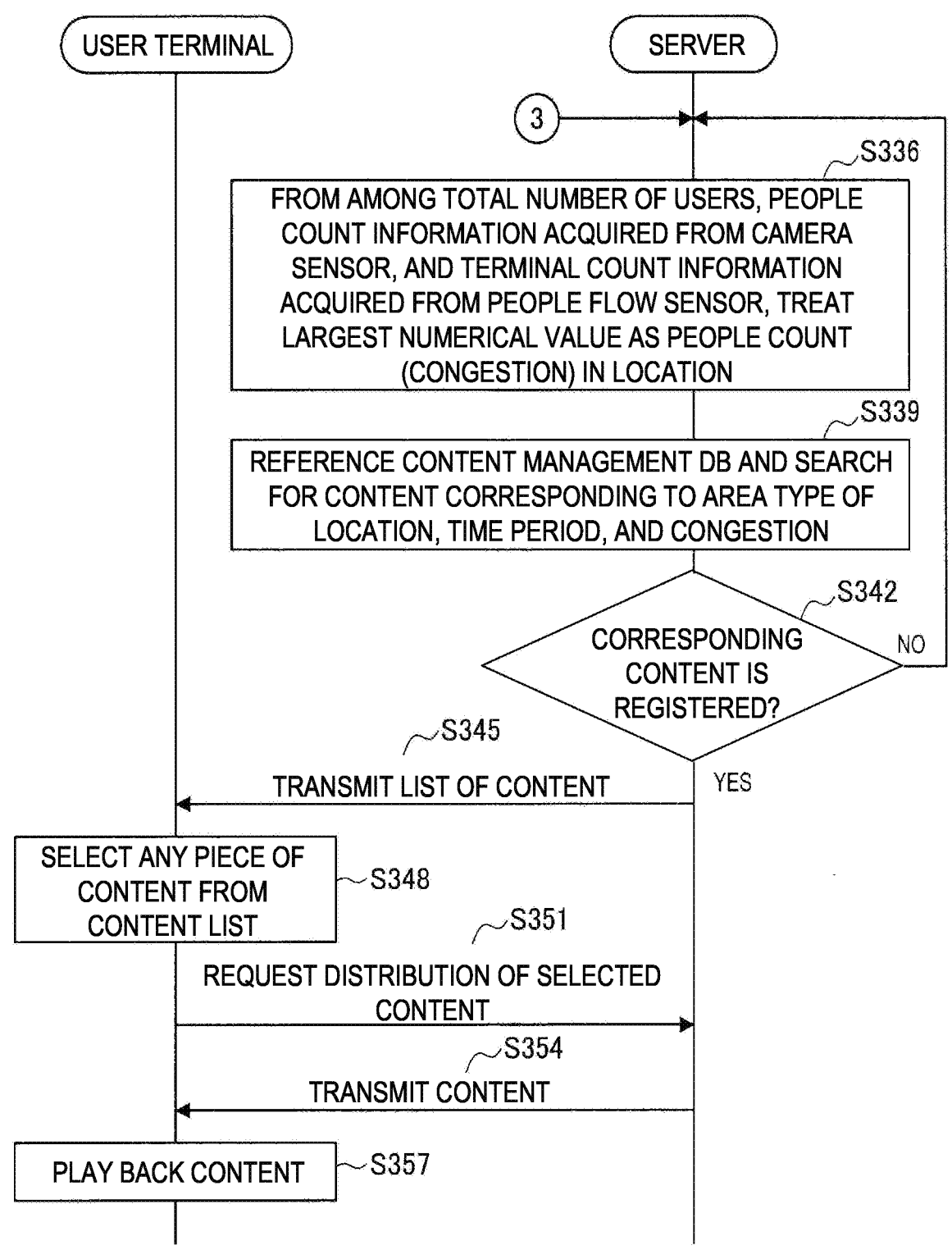
FIG. 21 is a sequence diagram illustrating a content distribution process according to the Second Example of the embodiment.
Figure 22:
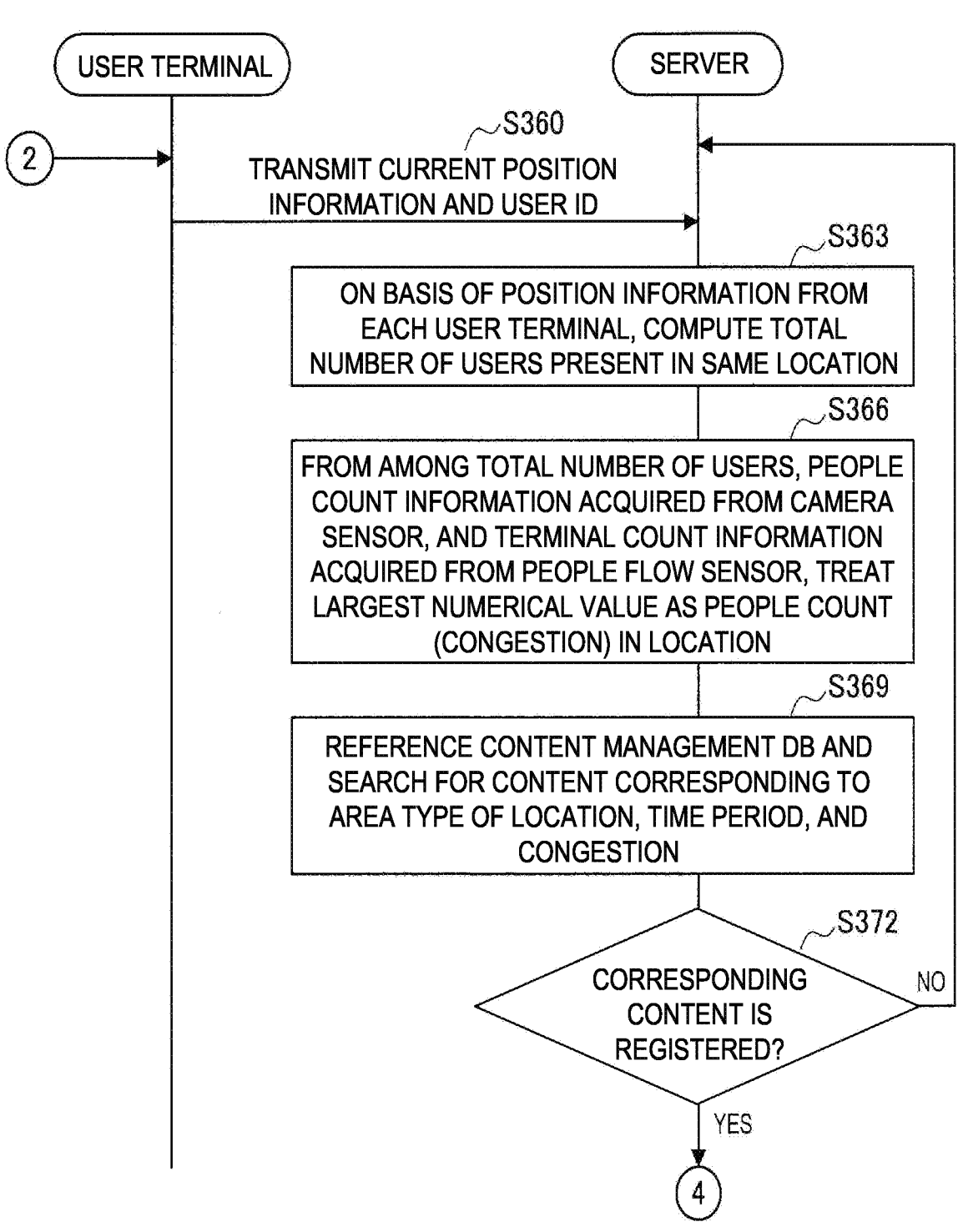
FIG. 22 is a sequence diagram illustrating a content distribution process according to the Second Example of the embodiment.

Hereinafter, an operating process according to the Second Example will be described with reference to FIGS. 20 to 22. FIGS. 20 to 22 are sequence diagrams illustrating a content distribution process according to the present Example.

As illustrated in FIG. 20, first, the people flow sensor 4B receives Wi-Fi radio waves (step S303), determines whether or not (one or more) Wi-Fi terminals (an information processing terminal that emits Wi-Fi radio waves; corresponds to the user terminal 1 in the present Example) exists nearby (step S306), and if (one or more) terminals exist, the people flow sensor 4B computes the number of terminals existing nearby (step S309).

Next, the people flow sensor 4B transmits terminal count information to the server 2 (step S312). The transmission of the terminal count information may be performed continually.

Subsequently, the camera sensor 4A installed in each location captures an image of the surroundings (step S313), determines whether or not any persons are included in the captured image (step S315), and if any persons are included, computes a people count (step S318). For example, the camera sensor 4A is capable of detecting persons with the motion capture function that detects the shapes of persons from the captured image, and computing the people count.

Next, the camera sensor 4A transmits people count information to the server 2 (step S321). The transmission of the people count information may be performed continually. Note that although the camera sensor 4A computes the people count based on a captured image as one example herein, the embodiment is not limited thereto, and the people count may also be computed by an external device on the basis of the captured image acquired by the camera sensor 4A. For example, the current number of people (density) in a predetermined zone may be totaled by an intermediate server on the basis of captured images from a plurality of camera sensors 4A installed in the zone, and output to the server 2.

Next, the user terminal 1 measures the current position (step S324), and if the user is unregistered (step S327/No), the user terminal 1 transmits current position information to the server 2 (step S330). The measurement and transmission of the current position to the server 2 may be executed by a dedicated application installed in the user terminal 1.

Subsequently, the server 2 computes the total number of users present in the same certain location on the basis of position information from each user terminal (step S333).

Next, as illustrated in FIG. 20, the unpleasant area determination unit 203 of the server 2 treats the largest numerical value from among the total number of users in a certain location computed in the above step S333, the people count information acquired from the camera sensor 4A installed in that location, and the terminal count information acquired from the people flow sensor 4B installed in the same location as the people count (congestion) of that location (step S336). With this arrangement, the congestion in the user's current location can be grasped.

Subsequently, the content distribution control unit 204 references the content management DB 221 and searches for content corresponding to the area type of the location, the time period, and the congestion (step S339). For example, in the case where the user's current location is inside an "area of Lan-Lan Land (amusement park)" and the current congestion is "90 persons per 10 meters square", the content management DB 221 is searched to create a list of distributable content matching such conditions in accordance with the distribution information registered in the content management DB 221.

Next, in the case where corresponding content is registered (step S342/Yes), the content list is transmitted (step S345).

Next, the user terminal 1 selects any piece of content from the content list (step S348), and requests the server 2 to distribute the selected content (step S351).

Subsequently, the server 2 transmits content according to the request (step S354), and the content is played back on the user terminal 1 (step S357).

Next, FIG. 22 will be referenced to describe content distribution in the case where the user is registered.

In the case where the user is registered (step S327/Yes, FIG. 20), as illustrated in FIG. 22, the user terminal 1 transmits the current position information and user ID to the server 2 (step S360). Note that the measurement of the current position and the transmission of the current position and the user ID to the server 2 may be executed by a dedicated application installed in the user terminal 1.

Next, the unpleasant area determination unit 203 of the server 2 computes the total number of users present in the same certain location on the basis of position information from each user terminal 1 (step S363).

Next, the unpleasant area determination unit 203 of the server 2 treats the largest numerical value from among the total number of users in a certain location computed in the above step S363, the people count information acquired from the camera sensor 4A installed in that location, and the terminal count information acquired from the people flow sensor 4B installed in the same location as the people count (congestion) of that location (step S366). With this arrangement, the congestion in the user's current location can be grasped.

Next, the content distribution control unit 204 references the content management DB 221 and searches for content corresponding to the area type of the location, the time period, and the congestion (step S369).

Figure 23:
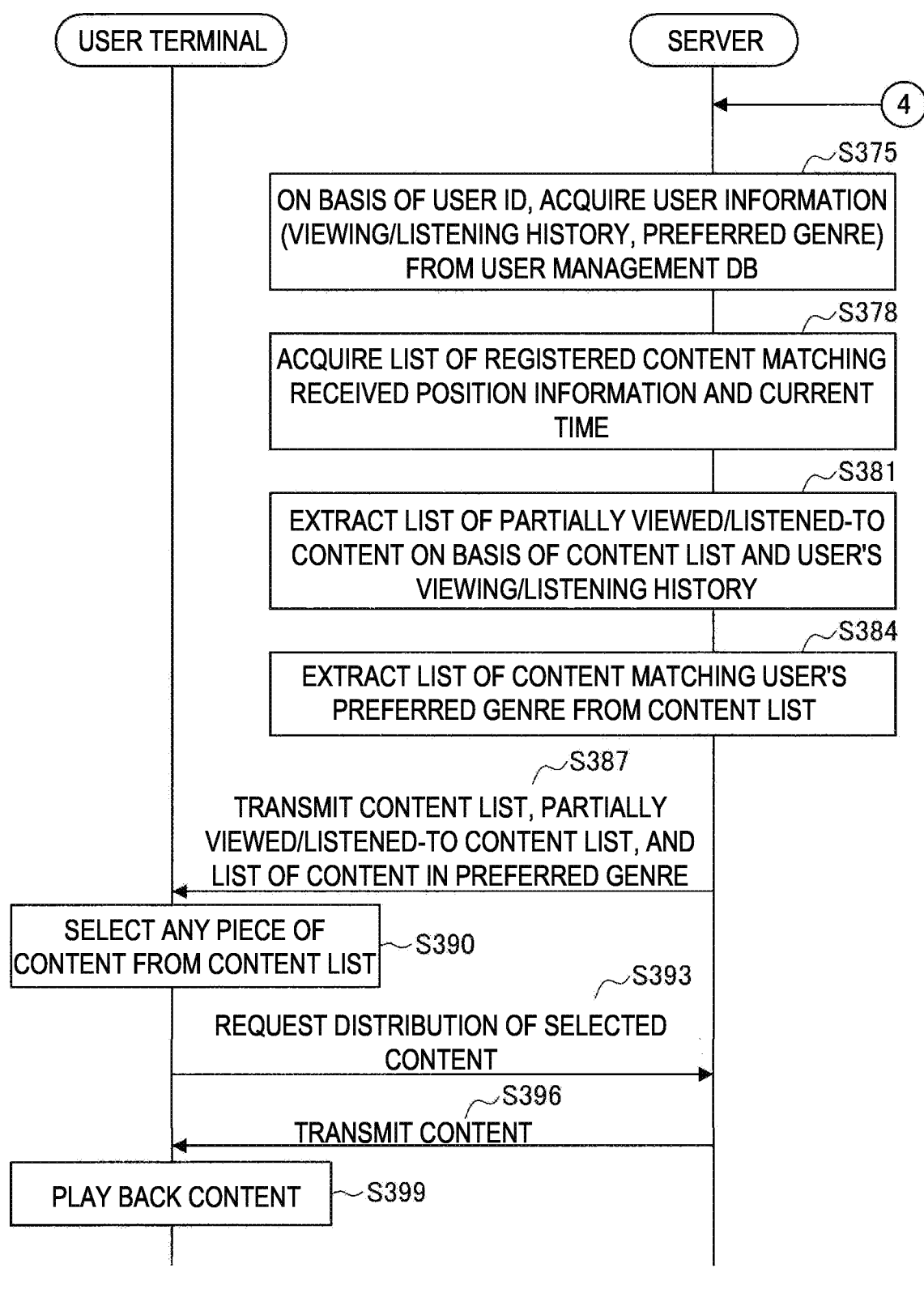
FIG. 23 is a sequence diagram illustrating a content distribution process according to the Second Example of the embodiment.

Next, in the case where corresponding content is registered (step S372/Yes), as illustrated in FIG. 23, the content distribution control unit 204 acquires user information (such as the viewing/listening history and preferred genre) from the user management DB 222 on the basis of the user ID (step S375).

Subsequently, the content distribution control unit 204 acquires a list of registered content that matches the received position information and the current time (step S378).

Next, the content distribution control unit 204 extracts a list of partially viewed/listened-to content on the basis of the acquired content list and the user's viewing/listening history (step S381).

Also, the content distribution control unit 204 extracts a list of content matching the user's preferred genre from out of the acquired content list (step S384).

The extraction of a partially viewed/listened-to content list and the extraction of a content list matching a preferred genre described above are positioned as premium services performed for registered users, similarly to the First Example.

Next, the content distribution control unit 204 transmits the acquired content list, the partially viewed/listened-to content list, and the list of content in the preferred genre to the user terminal 1 (step S387).

Next, the user terminal 1 selects any piece of content from each content list (step S390), and requests the server 2 to distribute the selected content (step S393).

Subsequently, the server 2 transmits content according to the request (step S396), and the content is played back on the user terminal 1 (step S399).

4-2-3. Third Example: Example of Detecting Line to Distribute Content

Next, the case of distributing content according whether or not a line is sensed by the camera sensor 4A installed in a location such as a shopping area, a resort, or inside a commuter train car will be described. Because the shapes of persons can be recognized by the camera sensor 4A, the length and progression of a line can also be grasped.

The camera sensor 4A detects a line and continually transmits information such as the length of the line (how many people are lined up) and face recognition results of persons waiting in the line to the server 2. From the current position information transmitted from the user terminal 1, the server 2 determines whether or not the user is in a zone (crowded zone) where a line has formed, and additionally determines whether the user is actually waiting in the line on the basis of the face recognition results. The face recognition of the user may be performed using a preregistered face image of the user. Additionally, the server 2 distributes corresponding specific content to the user while the user is waiting in line. For example, it is also possible to distribute content according to the remaining wait time in line.

Figure 24:
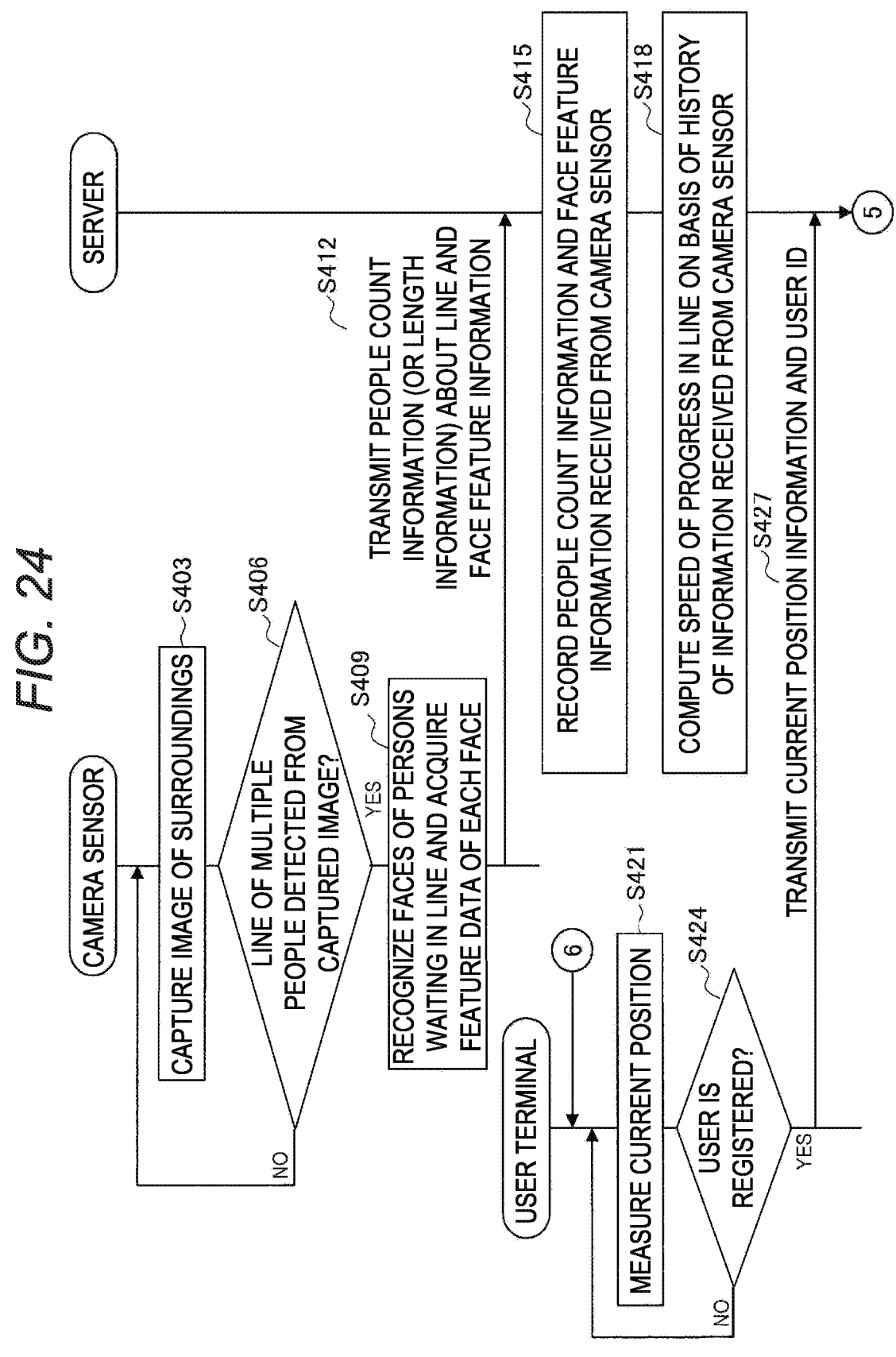
FIG. 24 is a sequence diagram illustrating a content distribution process according to a Third Example of the embodiment.
Figure 25:
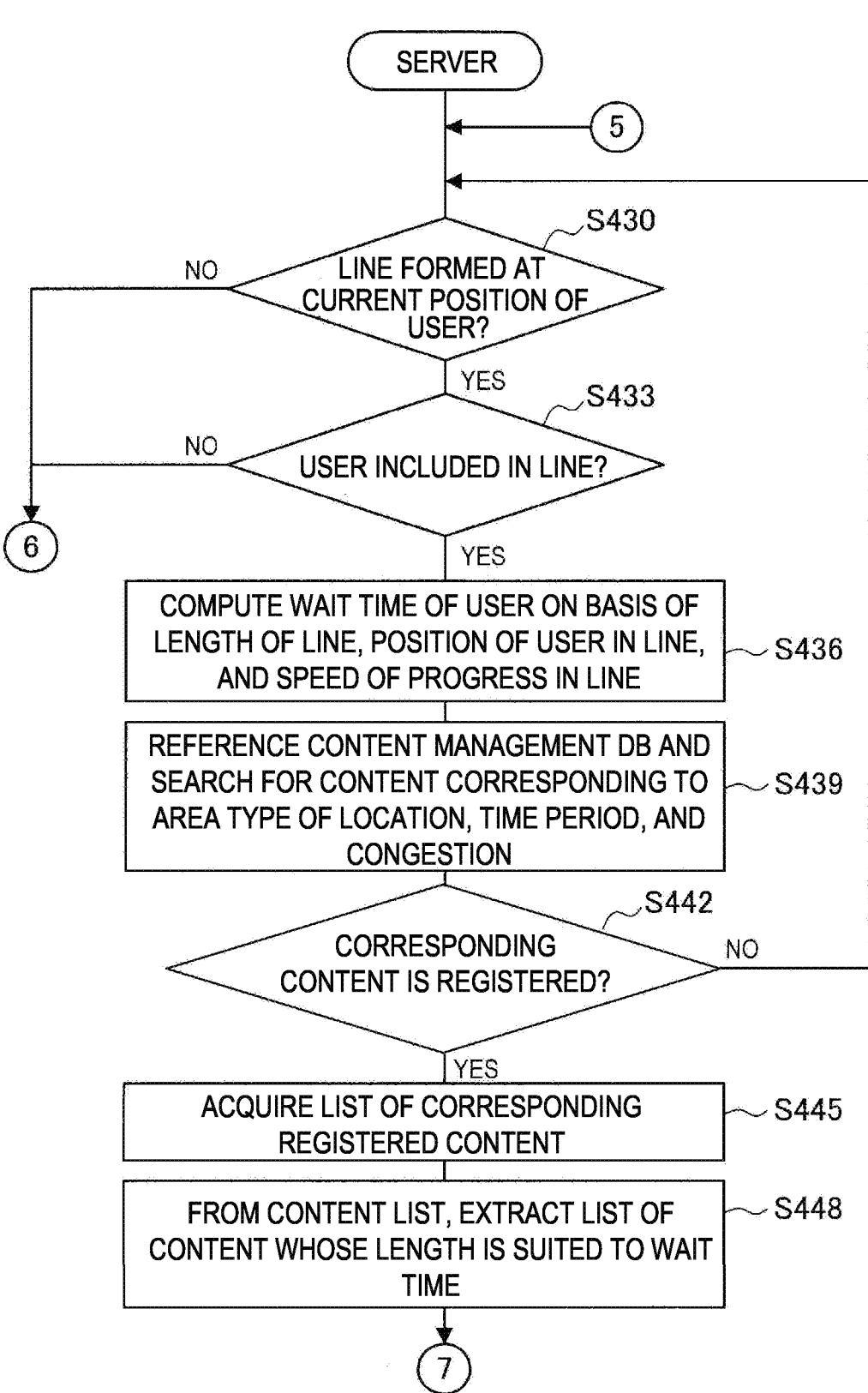
FIG. 25 is a sequence diagram illustrating a content distribution process according to the Third Example of the embodiment.
Figure 26:
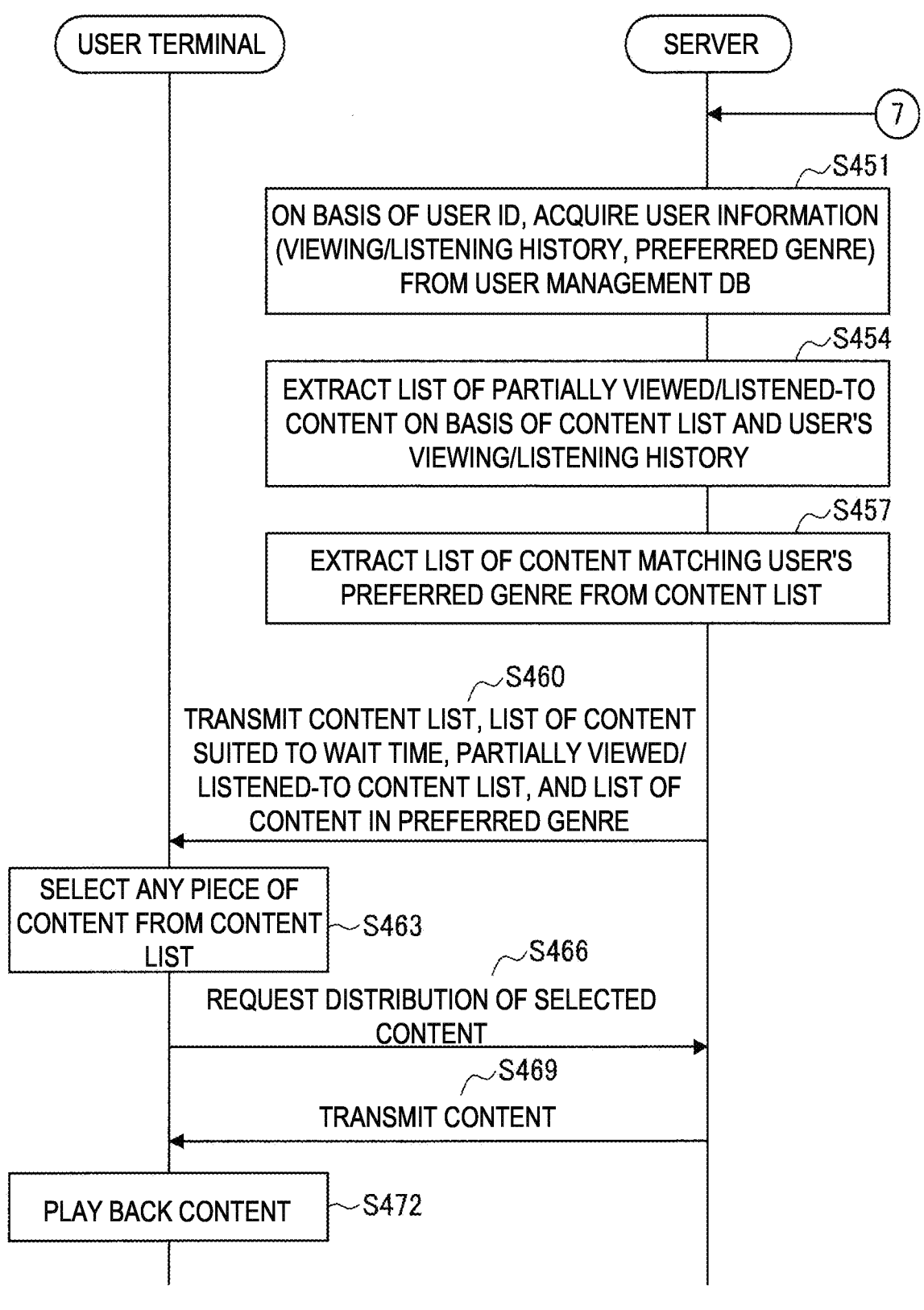
FIG. 26 is a sequence diagram illustrating a content distribution process according to the Third Example of the embodiment.

Hereinafter, an operating process according to the Third Example will be described with reference to FIGS. 24 to 26. FIGS. 24 to 26 are sequence diagrams illustrating a content distribution process according to the present Example.

As illustrated in FIG. 24, first, the camera sensor 4A installed in each location captures an image of the surroundings (step S403), analyzes the captured image to determine whether or not a line containing a plurality of persons is successfully detected (step S406), and in the case of successfully detecting a line, the camera sensor 4A recognizes the faces of the persons waiting in line and acquires feature data for each face (step S409). The camera sensor 4A can detect persons with the motion capture function that detects the shapes of persons from the captured image, determine that a line has formed in the case where a plurality of persons is lined up, and detect the line.

Next, the camera sensor 4A transmits people count information regarding the line (or information regarding the length of the line) and information regarding the face features of the persons in line to the server 2 (step S412). The transmission of this information may be performed continually. Note that in this Example, similarly to the Second Example, the analysis of captured images (herein, the line detection and face recognition) may also be performed by an external device other than the camera sensor 4A. For example, the computation of a line in a predetermined zone and the face recognition may be performed by an intermediate server on the basis of captured images from a plurality of camera sensors 4A installed in the zone, and output to the server 2.

Next, the unpleasant area determination unit 203 of the server 2 records the people count information and face feature information regarding the line received from the camera sensor 4A in the crowded zone information DB 223 (step S415).

Next, the unpleasant area determination unit 203 computes the speed of progress in the line on the basis of a history of recorded information related to the line received from the camera sensor 4A (step S418).

Next, the user terminal 1 measures the current position (step S421), and if the user is registered (step S424/Yes), the user terminal 1 transmits the current position information and the user ID to the server 2 (step S427). The measurement of the current position and transmission of the current position information and the user ID to the server 2 may be executed by a dedicated application installed in the user terminal 1.

Next, as illustrated in FIG. 25, the unpleasant area determination unit 203 of the server 2 determines whether or not a line has formed in the location where the user is present on the basis of current position information transmitted from the user terminal 1 (step S430).

Next, in the case where a line has formed (step S430/Yes), the unpleasant area determination unit 203 determines whether or not the user is included among the people waiting in line (step S433). Specifically, it is determined whether or not the user is actually waiting in the line, on the basis of the face feature information for each person waiting in line and the preregistered face image of the user. Note that as one example herein, a line is detected on the basis of a captured image taken by the camera sensor 4A and it is furthermore determined whether or not the user is actually waiting in line by face recognition. However, the embodiment is not limited to the above, and it is also possible to perform the detection of a line and the determination of whether or not a user is actually waiting in line on the basis of position information from each user. In other words, in the case where the position of each user can be ascertained precisely, such as in units of centimeters, from the current position information transmitted from each user terminal 1 for example, the unpleasant area determination unit 203 is capable of recognizing that a plurality of users has formed a line on the basis of the position information regarding each user, and the line can be detected. With this arrangement, because the position of the line is understood, the unpleasant area determination unit 203 can cross-reference the current position information regarding a user to determine whether or not the user is waiting in the line.

Next, in the case where the user is included in the line (step S433/Yes), the unpleasant area determination unit 203 computes the user's wait time on the basis of the length of the line, the user's position in the line, and the speed of progress in the line (step S436).

Next, the content distribution control unit 204 references the content management DB 221 and searches for content corresponding to the area type of the location, the time period, and the congestion (step S439).

Next, in the case where corresponding content is registered (step S442/Yes), the content distribution control unit 204 acquires a list of content from the content management DB 221 (step S445).

Next, a list of content whose length is suited to the wait time is extracted from out of the acquired content list (step S448). Content whose length is suited to the wait time is anticipated to be video or music that the user can finish watching or listening to within the wait time, for example.

Next, as illustrated in FIG. 26, the content distribution control unit 204 of the server 2 acquires user information (such as a viewing/listening history and a preferred genre) from the user management DB 222 on the basis of the user ID (step S451).

Next, the content distribution control unit 204 extracts a list of partially viewed/listened-to content on the basis of the acquired content list and the user's viewing/listening history (step S454).

Also, the content distribution control unit 204 extracts a list of content matching the user's preferred genre from out of the acquired content list (step S457).

The extraction of a partially viewed/listened-to content list, the extraction of a content list suited to the wait time, and the extraction of a content list matching a preferred genre described above are positioned as premium services performed for registered users, similarly to the First and Second Examples.

Next, the content distribution control unit 204 transmits the acquired content list, the content list suited to the wait time, the partially viewed/listened-to content list, and the list of content in the preferred genre to the user terminal 1 (step S460).

Next, the user terminal 1 selects any piece of content from each content list (step S463), and requests the server 2 to distribute the selected content (step S466).

Subsequently, the server 2 transmits content according to the request (step S469), and the content is played back on the user terminal 1 (step S472).

5. CONCLUSION

As described above, the information processing system according to the embodiment of the present disclosure is capable of distributing special content for relieving a user's negative circumstances.

Specifically, because people tend to experience negative emotions when in a crowded location such as inside a commuter train car or when waiting in line at an amusement park or popular shop, by having the information processing system according to the embodiment distribute predetermined special content presented only to persons who have put themselves in such locations, it is possible to relieve the negative circumstances and enable the persons to have fun.

Content may be distributed to all users present in the crowded location, or only to specific users (such as registered users, or registered users who are actually waiting in line).

Also, the embodiment describes how the content to distribute is preregistered in the server 2 by content businesses, but the embodiment is not limited thereto. For example, an unpleasant area determination result by the server 2 may be presented to a content business, and the distribution of content to the unpleasant area may be performed on the content business side.

The preferred embodiment(s) of the present disclosure has/have been described above with reference to the accompanying drawings, whilst the present technology is not limited to the above examples. A person skilled in the art may find various alterations and modifications within the scope of the appended claims, and it should be understood that they will naturally come under the technical scope of the present disclosure.

For example, it is also possible to create a computer program causing hardware such as the CPU, the ROM and the RAM installed in the above user terminal 1 or the server 2 to implement the function of the user terminal 1 or the server 2. Further, a computer-readable storage medium having the computer program stored therein is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

a communication unit configured to receive at least current position information regarding a user; and a control unit configured to cause the communication unit, if the control unit determines that a predetermined area containing a position indicated by the current position information is an area that makes people staying in the predetermined area feel unpleasant, to distribute specific content to the user.

(2)

The information processing system according to (1), in which the control unit determines that the predetermined area containing the position indicated by the current position information is an area that makes people staying in the predetermined area feel unpleasant on the basis of a table in which at least areas and congestion are associated.

(3)

The information processing system according to (1), in which congestion information related to a congestion of an area is received by the communication unit, and the control unit determines that the predetermined area containing the position indicated by the current position information is an area that makes people staying in the predetermined area feel unpleasant on the basis of the congestion information.

(4)

The information processing system according to (3), in which the communication unit receives information regarding a number of people included in an image as the congestion information from an imaging device near a current position of the user.

(5)

The information processing system according to (3), in which the communication unit receives a count of Wi-Fi terminals from which radio waves have been received as the congestion information from a Wi-Fi radio wave detection unit near a current position of the user.

(6)

The information processing system according to (3), in which the control unit sets a number of users positioned near a current position of the user as the congestion information.

(7)

The information processing system according to (3), in which if the control unit estimates that the user is waiting in a line on the basis of the current position information regarding the user, the control unit determines that an area having the line containing the position indicated by the current position information is an area that makes people staying in the area feel unpleasant.

(8)

The information processing system according to (7), in which the communication unit receives feature data of faces of a plurality of users forming a line, the faces appearing in an image taken by an imaging device near a current position of the user, and in a case where feature data of a face of the user registered in advance exists among the feature data of the faces of the plurality of users forming the line, the control unit determines that an area having the line containing the position indicated by the current position information regarding the user is an area that makes people staying in the area feel unpleasant.

(9)

The information processing system according to (7), in which in a case where the control unit determines that the user is waiting in the line on the basis of current position information regarding a plurality of users positioned near the user, the control unit estimates that an area having the line containing the position indicated by the current position information is an area that makes people staying in the area feel unpleasant.

(10)

The information processing system according to any one of (7) to (9), in which the control unit causes AR content related to the line to be distributed to the user.

(11)

The information processing system according to any one of (7) to (10), in which the control unit causes content related to the line to be distributed to a display device disposed near the user.

(12)

The information processing system according to (11), in which the display device disposed near the user includes a display terminal device carried by an other user present near the user, and the control unit causes AR content related to the line to be distributed to display terminal devices carried by the user and the other user.

(13)

The information processing system according to any one of (7) to (12), in which the control unit computes a wait time of the user waiting in the line on the basis of current position information regarding a plurality of users including the user, and selects content matching the wait time.

(14)

The information processing system according to any one of (1) to (13), in which the control unit causes the communication unit to distribute content personalized to the user on the basis of user information indicating user preferences managed on a per-user basis.

(15)

The information processing system according to any one of (1) to (14), in which when the user has partially finished viewing or listening to content on the basis of a content viewing/listening history managed on a per-user basis, the control unit causes the communication unit to distribute the content to enable the user to resume viewing or listening to the content.

(16)

The information processing system according to any one of (1) to (15), in which the communication unit receives biological information regarding the user, and in a case where the control unit estimates that the user feels unpleasant on the basis of the biological information regarding the user, the control unit determines that a predetermined area containing a position indicated by the current position information is an unpleasant area, and causes the communication unit to distribute specific content to the user.

(17)

The information processing system according to any one of (1) to (9), in which the specific content includes a content list, and the control unit causes content selected from the content list to be distributed.

(18)

An information processing device including:

a communication unit configured to transmit at least current position information regarding a user to a server;

an output unit configured to output specific content acquired through the communication unit from the server that has estimated that a predetermined area containing a position indicated by the current position information is an area that makes people staying in the predetermined area feel unpleasant; and a control unit configured to cause the communication unit to receive the specific content distributed by the server to the user, and also cause the output unit to output the specific content.

(19)

An information processing method, by a processor, including:

receiving, through a communication unit, at least current position information regarding a user; and causing the communication unit, if a predetermined area containing a position indicated by the current position information is determined to be an area that makes people staying in the predetermined area feel unpleasant, to distribute specific content to the user.

(20)

A recording medium storing a program for causing a computer to function as:

a communication unit configured to transmit at least current position information regarding a user to a server;

an output unit configured to output specific content acquired through the communication unit from the server that has estimated that a predetermined area containing a position indicated by the current position information is an area that makes people staying in the predetermined area feel unpleasant; and a control unit configured to cause the communication unit to receive the specific content distributed by the server to the user, and also cause the output unit to output the specific content.

(21)

An information processing system including:

a control unit configured to cause specific content to be distributed to a user if the control unit determines that the user is waiting in a line on the basis of current position information regarding the user.

REFERENCE SIGNS LIST

1 User terminal
2 Server

3 Network
4A Camera sensor
4B People flow sensor
5 (5A to 5C) Content business server
6 Signage device
10 Control unit
101 User information management unit
102 Content output control unit
11 Communication unit
12 Input unit
13 Position sensor
14 Output unit
15 Storage unit
20 Control unit
201 Content registration unit
202 User management unit
203 Unpleasant area determination unit
204 Content distribution control unit
21 Communication unit
22 Storage unit
221 Content management DB
222 User management DB
223 Crowded zone information DB

The invention claimed is:

1. An information processing system, comprising:
circuitry configured to
receive current position information and biological information regarding a user;
estimate that the user feels unpleasant based the received biological information;
determine that the user is waiting in a line based on the received current position information;
compute a wait time of the user waiting in the line based on at least a length of the line and the position of the user in the line;
select specific content having a length that matches the computed wait time of the user; and
in response to estimating that the user feels unpleasant, distribute the selected specific content to a device carried by the user and another device carried by another user located near the user, based on the received current position information.

2. The information processing system according to claim 1, wherein the circuitry is further configured to estimate that the user feels unpleasant further based on a table associating areas with congestion.

3. The information processing system according to claim 1, wherein the circuitry is further configured to determine that the user feels unpleasant further based on received congestion information.

4. The information processing system according to claim 3, wherein the congestion information received by the circuitry includes an image depicting a number of people present in an area corresponding to the current position information.

5. The information processing system according to claim 3, wherein the congestion information received by the circuitry includes information on a number of Wi-Fi terminals detected in an area corresponding to the current position information.

6. The information processing system according to claim 3, wherein the congestion information received by the circuitry includes a number of users positioned near the user, based on the current position information.

7. The information processing system according to claim 1, further comprising a camera configured to capture image data of an area corresponding to the current position information, and transmit the image data to the circuitry.

8. The information processing system according to claim 1, wherein the selected specific content distributed to the user by the circuitry includes augmented reality content.

9. The information processing system according to claim 8, wherein the augmented reality content distributed to the user by the circuitry is related to an area corresponding to the current position information.

10. The information processing apparatus of claim 1, wherein the circuitry is further configured to select the specific content having the length that matches the computed wait time, wherein the content is audio or video content having the length, which is a length that allows the user to finish listening to or watching the content within the computed wait time.

11. An information processing method, comprising:
receiving current position information and biological information regarding a user;
estimating that the user feels unpleasant based the received biological information;
determining that the user is waiting in a line based on the received current position information;
computing a wait time of the user waiting in the line based on at least a length of the line and the position of the user in the line;
selecting specific content having a length that matches the computed wait time of the user; and
in response to estimating that the user feels unpleasant, distributing the selected specific content to a device carried by the user and another device carried by another user located near the user, based on the received current position information.

12. A non-transitory computer-readable medium storing a program that, when executed by circuitry, causes the circuitry to perform an information processing method, comprising:
receiving current position information and biological information regarding a user;
estimating that the user feels unpleasant based the received biological information;
determining that the user is waiting in a line based on the received current position information;
computing a wait time of the user waiting in the line based on at least a length of the line and the position of the user in the line;
selecting specific content having a length that matches the computed wait time of the user; and
in response to estimating that the user feels unpleasant, distributing the selected specific content to a device carried by the user and another device carried by another user located near the user, based on the received current position information.

* * * * *